(12) United States Patent
Weagle

(10) Patent No.: US 10,518,836 B2
(45) Date of Patent: *Dec. 31, 2019

(54) SUSPENSION ASSEMBLY FOR A CYCLE

(71) Applicant: TRVSTPER, INC., Salt Lake City, UT (US)

(72) Inventor: David Weagle, Edgartown, MA (US)

(73) Assignee: TRVSTPER, INC., Salt Lake City, UT (US)

( * ) Notice: Subject to any disclaimer, the term of this patent is extended or adjusted under 35 U.S.C. 154(b) by 0 days.

This patent is subject to a terminal disclaimer.

(21) Appl. No.: 16/158,858

(22) Filed: Oct. 12, 2018

(65) Prior Publication Data

US 2019/0047657 A1 Feb. 14, 2019

Related U.S. Application Data

(63) Continuation-in-part of application No. 15/661,821, filed on Jul. 27, 2017, now Pat. No. 10,196,106.

(51) Int. Cl.
*B62K 25/02* (2006.01)

(52) U.S. Cl.
CPC ........ *B62K 25/02* (2013.01); *B62K 2025/025* (2013.01); *B62K 2201/08* (2013.01)

(58) Field of Classification Search
CPC ........ B62K 25/02; B62K 25/06; B62K 25/08; B62K 2025/025
See application file for complete search history.

(56) References Cited

U.S. PATENT DOCUMENTS

| 389,200 A | 9/1888 | Clegg |
|---|---|---|
| 393,387 A | 11/1888 | Norton |
| 400,727 A | 4/1889 | Baudreau |

(Continued)

FOREIGN PATENT DOCUMENTS

| BE | 507753 A | 12/1951 |
|---|---|---|
| CA | 474575 A | 6/1951 |

(Continued)

OTHER PUBLICATIONS

Color photograph of Armstrong motor cycle, Applicant Admitted Prior Art, Applicant's internal files.

(Continued)

*Primary Examiner* — Tony H Winner
(74) *Attorney, Agent, or Firm* — Marshall, Gerstein & Borun LLP

(57) ABSTRACT

A trailing link, multi-link, suspension assembly for a cycle having improved stability includes a first arm having a first arm fixed pivot and a first arm shock pivot. A shock link has a shock link fixed pivot and a shock link floating pivot. A shock absorber has a first shock mount and a second shock mount. A wheel carrier has a wheel carrier first pivot and a wheel carrier second pivot spaced apart from one another, and a wheel mount that is adapted to be connected to a wheel. A control link has a control link floating pivot and a control link fixed pivot, the control link floating pivot being pivotably connected to the wheel carrier second pivot, and the control link fixed pivot being pivotably connected to the first arm control pivot. A mechanical trail distance increases as the suspension assembly compresses relative to a fully extended state.

19 Claims, 14 Drawing Sheets

(56) References Cited

U.S. PATENT DOCUMENTS

| | | |
|---|---|---|
| 412,322 A | 10/1889 | Copeland |
| 414,048 A | 10/1889 | Hunter |
| 423,471 A | 3/1890 | Easthope |
| 426,402 A | 4/1890 | Torkelson |
| 435,477 A | 9/1890 | Blackledge |
| 441,649 A | 12/1890 | Dunlop |
| 443,266 A | 12/1890 | Bell |
| 444,639 A | 1/1891 | O'Neill |
| 447,234 A | 2/1891 | Donnelly |
| 467,794 A | 1/1892 | Ellis |
| 468,643 A | 2/1892 | Clement |
| 524,389 A | 8/1894 | La Casse |
| 602,354 A | 4/1898 | Ohlgart |
| 638,723 A | 12/1899 | Kelly |
| 739,476 A | 9/1903 | Becker |
| 783,236 A | 2/1905 | Ashburn |
| 848,324 A | 3/1907 | Sager |
| 913,961 A | 3/1909 | Levedahl |
| 927,989 A | 7/1909 | Meiser |
| 940,245 A | 11/1909 | Gates |
| 946,143 A | 1/1910 | Levedahl |
| 953,697 A | 4/1910 | Kuebodeaux |
| 973,071 A | 10/1910 | Redmond |
| 979,674 A | 12/1910 | Kittle et al. |
| 980,999 A | 1/1911 | Pommer |
| 989,638 A | 4/1911 | Pilgrim |
| 1,000,115 A | 8/1911 | Oquist |
| 1,036,263 A | 8/1912 | Kittle |
| 1,042,480 A | 10/1912 | Ridgway |
| 1,077,105 A | 10/1913 | Stewart |
| 1,096,417 A | 5/1914 | Ekstrom |
| 1,101,614 A | 6/1914 | Bramham |
| 1,132,829 A | 3/1915 | Cobb |
| 1,144,753 A | 6/1915 | Budroe |
| 1,166,156 A | 12/1915 | Shimmin |
| 1,189,874 A | 7/1916 | Schickel |
| 1,203,927 A | 11/1916 | Stagni |
| 1,213,995 A | 1/1917 | Anderson |
| 1,223,572 A | 4/1917 | Drew |
| 1,227,634 A | 5/1917 | Lake |
| 1,251,992 A | 1/1918 | Drew |
| 1,254,798 A | 1/1918 | Harley |
| 1,273,179 A | 7/1918 | Perry et al. |
| 1,298,958 A | 4/1919 | Johnston |
| 1,333,449 A | 3/1920 | Russell |
| 1,365,524 A | 1/1921 | Mellantine |
| 1,397,850 A | 11/1921 | Yoxall et al. |
| 1,432,376 A | 10/1922 | Wolff |
| 1,452,436 A | 4/1923 | Pullin |
| 1,475,044 A | 11/1923 | Bloom |
| 1,517,146 A | 11/1924 | Bloom |
| 1,527,133 A | 2/1925 | Harley |
| 1,605,680 A | 11/1926 | Merkel |
| 1,834,308 A | 12/1931 | Harley |
| 1,924,363 A | 8/1933 | Kanai |
| 2,038,011 A | 4/1936 | Spiegler et al. |
| 2,073,736 A | 3/1937 | Duffy |
| 2,087,299 A | 7/1937 | Pribil |
| 2,160,034 A | 5/1939 | Schwinn |
| 2,203,342 A | 6/1940 | Sloman |
| 2,233,313 A | 2/1941 | Hazelroth |
| 2,271,304 A | 1/1942 | Mulholland |
| 2,303,568 A | 12/1942 | McWhorter et al. |
| 2,376,788 A | 5/1945 | Latscher-Latka |
| 2,462,711 A | 2/1949 | Barnett |
| 2,463,310 A | 3/1949 | Probst |
| 2,464,326 A | 3/1949 | MacGregor |
| 2,475,774 A | 7/1949 | Benson |
| 2,485,484 A | 10/1949 | Dean |
| 2,486,430 A | 11/1949 | Moore |
| 2,489,821 A | 11/1949 | Ryder |
| 2,504,452 A | 4/1950 | Rostan |
| 2,525,171 A | 10/1950 | Franks |
| 2,537,679 A | 1/1951 | Kraeft |
| 2,540,585 A | 2/1951 | Kranz |
| 2,543,991 A | 3/1951 | Schuricht |
| 2,550,876 A | 5/1951 | Spencer |
| 2,561,156 A | 7/1951 | Thorkildsen |
| 2,588,889 A | 3/1952 | Sherwood |
| 2,596,411 A | 5/1952 | Jordan |
| 2,636,567 A | 4/1953 | Landrum |
| 2,649,312 A | 8/1953 | Miller |
| 2,660,455 A | 11/1953 | Douglas et al. |
| 2,708,112 A | 5/1955 | Seddon et al. |
| 2,729,465 A | 1/1956 | Torre |
| 2,751,991 A | 6/1956 | Mennesson |
| 2,752,167 A | 6/1956 | Propst et al. |
| 2,756,070 A | 7/1956 | Torre |
| 2,756,832 A | 7/1956 | Dalrymple |
| 2,918,306 A | 12/1959 | Lewandoski |
| 2,953,395 A | 9/1960 | Turner |
| 2,969,992 A | 1/1961 | Hahn |
| 2,976,056 A | 3/1961 | Henry |
| 3,083,038 A | 3/1963 | Moulton |
| 3,133,748 A | 5/1964 | Gunnerson |
| 3,433,318 A | 3/1969 | Packard |
| 3,694,004 A | 9/1972 | Siebers |
| 3,701,544 A | 10/1972 | Stankovich |
| 3,730,553 A | 5/1973 | Harman |
| 3,774,935 A | 11/1973 | Aldrich |
| 3,942,821 A | 3/1976 | Bock |
| 3,944,254 A | 3/1976 | Inui |
| 3,954,284 A | 5/1976 | Phillips et al. |
| 3,989,261 A | 11/1976 | Kawaguchi |
| 4,057,264 A | 11/1977 | Suzuki et al. |
| 4,147,371 A | 4/1979 | Morita et al. |
| 4,153,237 A | 5/1979 | Supalla |
| 4,159,123 A | 6/1979 | Petty |
| 4,162,797 A | 7/1979 | McBride |
| 4,170,369 A | 10/1979 | Strutman |
| 4,179,135 A | 12/1979 | Slater |
| 4,180,280 A | 12/1979 | Doveri |
| 4,184,695 A | 1/1980 | Roe et al. |
| 4,186,936 A | 2/1980 | Offenstadt et al. |
| 4,189,168 A | 2/1980 | Courtney |
| 4,212,481 A | 7/1980 | Ribi |
| 4,265,329 A | 5/1981 | de Cortanze |
| 4,268,055 A | 5/1981 | Bell |
| 4,295,658 A | 10/1981 | Kashima |
| 4,367,882 A | 1/1983 | Alexander et al. |
| 4,388,978 A | 6/1983 | Fior |
| 4,401,316 A | 8/1983 | Miyakoshi et al. |
| 4,406,475 A | 9/1983 | Miyakoshi et al. |
| 4,410,196 A | 10/1983 | Ribi |
| 4,421,337 A | 12/1983 | Pratt |
| 4,422,662 A | 12/1983 | Inoue et al. |
| 4,433,850 A | 2/1984 | Miyakoshi et al. |
| 4,433,851 A | 2/1984 | Miyakoshi et al. |
| 4,437,678 A | 3/1984 | Schultz |
| 4,438,909 A | 3/1984 | Matsumoto |
| 4,444,406 A | 4/1984 | Isono |
| 4,455,032 A | 6/1984 | Kajikawa |
| 4,480,711 A | 11/1984 | Satoh et al. |
| 4,520,892 A | 6/1985 | Satoh |
| 4,526,249 A | 7/1985 | Parker |
| 4,531,755 A | 7/1985 | Isono et al. |
| 4,533,153 A | 8/1985 | Tsunoda et al. |
| 4,540,190 A | 9/1985 | Moulton |
| 4,542,910 A | 9/1985 | Watanabe |
| 4,561,669 A | 12/1985 | Simons |
| 4,570,963 A | 2/1986 | Isono |
| 4,572,534 A | 2/1986 | Heyl |
| 4,576,393 A | 3/1986 | Moulton et al. |
| 4,585,245 A | 4/1986 | Rose |
| 4,616,810 A | 10/1986 | Richardson et al. |
| 4,625,985 A | 12/1986 | Nakano et al. |
| 4,650,027 A | 3/1987 | de Cortanze |
| 4,660,683 A | 4/1987 | Hayashi et al. |
| 4,685,694 A | 8/1987 | Kouyama |
| 4,702,338 A | 10/1987 | Trema |
| 4,703,839 A | 11/1987 | Yasuo et al. |
| 4,723,621 A | 2/1988 | Kawano et al. |
| 4,732,241 A | 3/1988 | Yoshida |
| 4,738,468 A | 4/1988 | Baron |

(56) References Cited

U.S. PATENT DOCUMENTS

| | | |
|---|---|---|
| 4,741,545 A | 5/1988 | Honma et al. |
| 4,742,884 A | 5/1988 | Ishikawa |
| 4,744,434 A | 5/1988 | Miyakoshi et al. |
| 4,770,434 A | 9/1988 | Pietro et al. |
| 4,775,163 A | 10/1988 | McGowan et al. |
| 4,776,609 A | 10/1988 | Pan et al. |
| 4,789,174 A | 12/1988 | Lawwill |
| 4,807,898 A | 2/1989 | Huntly |
| 4,809,802 A | 3/1989 | Seino et al. |
| 4,815,763 A | 3/1989 | Hartmann |
| 4,828,069 A | 5/1989 | Hatsuyama |
| 4,834,412 A | 5/1989 | Trema |
| 4,878,558 A | 11/1989 | Asakura |
| 4,881,750 A | 11/1989 | Hartmann |
| 4,890,857 A | 1/1990 | de Cortanze |
| 4,971,344 A | 11/1990 | Turner |
| 4,993,734 A | 2/1991 | Trema |
| 4,997,197 A | 3/1991 | Shultz |
| 5,009,451 A | 4/1991 | Hayashi et al. |
| 5,042,608 A | 8/1991 | Horiike et al. |
| 5,050,699 A | 9/1991 | Savard |
| 5,064,212 A | 11/1991 | Yun |
| 5,069,303 A | 12/1991 | Fuller |
| 5,069,467 A | 12/1991 | Claudio |
| 5,088,705 A | 2/1992 | Tsai |
| 5,133,223 A | 7/1992 | Morri |
| 5,156,231 A | 10/1992 | Trema |
| 5,186,481 A | 2/1993 | Turner |
| 5,193,832 A | 3/1993 | Wilson et al. |
| 5,193,833 A | 3/1993 | Reisinger |
| 5,195,766 A | 3/1993 | Dohrmann et al. |
| 5,219,211 A | 6/1993 | Tsuchida et al. |
| 5,248,159 A | 9/1993 | Moore |
| 5,249,650 A | 10/1993 | Tanaka |
| 5,269,549 A | 12/1993 | Wilson et al. |
| 5,284,352 A | 2/1994 | Chen |
| 5,299,820 A | 4/1994 | Lawwill |
| 5,308,099 A | 5/1994 | Browning |
| 5,310,203 A | 5/1994 | Chen |
| 5,320,374 A | 6/1994 | Farris et al. |
| 5,328,196 A | 7/1994 | Ohma |
| 5,350,185 A | 9/1994 | Robinson |
| 5,354,085 A | 10/1994 | Gally |
| 5,359,910 A | 11/1994 | Chang et al. |
| 5,361,864 A | 11/1994 | Tanaka |
| 5,380,026 A | 1/1995 | Robinson |
| 5,403,028 A | 4/1995 | Trimble |
| 5,405,159 A | 4/1995 | Klein et al. |
| 5,409,248 A | 4/1995 | Williams |
| 5,413,368 A | 5/1995 | Pong et al. |
| 5,417,446 A | 5/1995 | Pileggi |
| 5,427,208 A | 6/1995 | Motobu et al. |
| 5,427,397 A | 6/1995 | Chonan |
| 5,429,380 A | 7/1995 | Lawwill |
| 5,431,426 A | 7/1995 | Ijams et al. |
| 5,441,291 A | 8/1995 | Girvin, III |
| 5,449,155 A | 9/1995 | Mack |
| 5,456,480 A | 10/1995 | Turner et al. |
| 5,462,302 A | 10/1995 | Leitner |
| D368,054 S | 3/1996 | Behrens et al. |
| 5,498,013 A | 3/1996 | Hwang |
| 5,509,674 A | 4/1996 | Browning |
| 5,509,676 A | 4/1996 | Fukutake et al. |
| 5,564,534 A | 10/1996 | Toyoda et al. |
| 5,599,034 A | 2/1997 | Brigden |
| 5,720,473 A | 2/1998 | Thomas |
| 5,743,547 A * | 4/1998 | Voss .................... B62K 25/08 280/277 |
| 5,749,590 A | 5/1998 | Roerig |
| 5,782,313 A | 7/1998 | Kurawaki et al. |
| 5,799,963 A | 9/1998 | Berkmann |
| 5,813,684 A | 9/1998 | Baron |
| 5,829,773 A | 11/1998 | Rajaee |
| 5,855,388 A | 1/1999 | Brewer |
| 5,899,478 A | 5/1999 | Woodside |
| 5,908,200 A | 6/1999 | Stewart |
| 5,931,487 A | 8/1999 | Koppelberg et al. |
| 5,931,489 A | 8/1999 | Damman et al. |
| 5,951,033 A | 9/1999 | Winter et al. |
| 6,017,047 A | 1/2000 | Hoose |
| 6,036,211 A | 3/2000 | Nohr |
| 6,047,981 A | 4/2000 | Burrows |
| 6,089,585 A | 7/2000 | Theobald |
| 6,149,173 A | 11/2000 | Bynoe |
| 6,152,472 A | 11/2000 | Woodside |
| 6,155,370 A | 12/2000 | Iwai et al. |
| 6,164,424 A | 12/2000 | Girvin et al. |
| 6,164,675 A | 12/2000 | Pickering |
| 6,199,885 B1 | 3/2001 | Seidl |
| 6,244,609 B1 | 6/2001 | Wilson |
| 6,260,869 B1 | 7/2001 | Hanlon et al. |
| 6,260,870 B1 | 7/2001 | Fan |
| 6,263,994 B1 | 7/2001 | Eitel |
| 6,336,647 B1 | 1/2002 | Iwai et al. |
| 6,357,775 B1 | 3/2002 | Iwai et al. |
| 6,371,263 B1 | 4/2002 | Hoose |
| 6,382,374 B1 | 5/2002 | Iwai et al. |
| 6,386,567 B1 | 5/2002 | Schonfeld |
| 6,402,175 B1 | 6/2002 | Jansson |
| 6,457,732 B2 | 10/2002 | Ito et al. |
| 6,485,043 B2 | 11/2002 | Ito et al. |
| 6,488,300 B2 | 12/2002 | Ito et al. |
| 6,517,095 B1 | 2/2003 | Lansac et al. |
| 6,517,096 B2 | 2/2003 | Yih |
| 6,533,305 B1 | 3/2003 | Falk |
| 6,783,140 B1 | 8/2004 | Huang |
| 6,789,810 B2 | 9/2004 | Strong |
| 6,896,276 B1 | 5/2005 | Sparrow |
| 6,908,092 B2 | 6/2005 | Kofuji et al. |
| 6,910,702 B1 | 6/2005 | Hals |
| 6,918,605 B2 | 7/2005 | Wada et al. |
| 6,994,365 B2 | 2/2006 | Kofuji |
| 7,011,325 B2 | 3/2006 | Kinzler et al. |
| 7,140,627 B2 | 11/2006 | Wimmer |
| 7,159,883 B2 | 1/2007 | Mydlarz |
| 7,210,695 B2 | 5/2007 | Griffiths |
| 7,331,594 B2 | 2/2008 | Wimmer |
| 7,350,787 B2 | 4/2008 | Voss |
| 7,364,178 B2 | 4/2008 | Wimmer |
| 7,425,008 B2 | 9/2008 | Pokrywka |
| 7,425,009 B2 | 9/2008 | Namazue et al. |
| 7,434,823 B2 | 10/2008 | Robinson et al. |
| 7,441,622 B2 | 10/2008 | Costa |
| 7,635,141 B2 | 12/2009 | O'Connor |
| 7,699,330 B2 | 4/2010 | Chen |
| 7,708,296 B2 | 5/2010 | Becker et al. |
| 7,744,107 B2 | 6/2010 | Chen |
| 7,887,077 B2 | 2/2011 | Thiers |
| 7,896,379 B2 | 3/2011 | Nagao et al. |
| 8,448,970 B1 | 5/2013 | Vardon |
| 8,534,692 B2 | 9/2013 | Trebichaysky |
| 8,939,458 B2 | 1/2015 | Nesbitt, III |
| 9,248,883 B2 | 2/2016 | D'Aluisio |
| 9,707,817 B1 | 7/2017 | Arnott et al. |
| 10,196,106 B1 | 2/2019 | Weagle |
| 10,300,979 B2 | 5/2019 | Weagle |
| 10,308,312 B2 | 6/2019 | Weagle |
| 2001/0019197 A1 | 9/2001 | Ito et al. |
| 2002/0084619 A1 | 7/2002 | Odom |
| 2004/0036250 A1 | 2/2004 | Kofuji |
| 2008/0258424 A1 | 10/2008 | Paul |
| 2008/0296863 A1 | 12/2008 | Heyl et al. |
| 2008/0303242 A1 | 12/2008 | O'Connor |
| 2009/0033009 A1 | 2/2009 | Kirchner et al. |
| 2010/0244340 A1 | 9/2010 | Wootten et al. |
| 2011/0012321 A1 | 1/2011 | Chen |
| 2012/0248666 A1 | 10/2012 | DeBruler et al. |
| 2014/0061987 A1 | 3/2014 | DeBruler et al. |
| 2014/0202809 A1 | 7/2014 | Ozaki et al. |
| 2017/0087932 A1 | 3/2017 | Winshtein et al. |
| 2017/0198779 A1 | 7/2017 | Batsch et al. |
| 2017/0219041 A1 | 8/2017 | Debruler et al. |
| 2017/0284493 A1 | 10/2017 | Smith |
| 2019/0031275 A1 | 1/2019 | Weagle |

(56) References Cited

U.S. PATENT DOCUMENTS

| | | |
|---|---|---|
| 2019/0031276 A1 | 1/2019 | Weagle |
| 2019/0031277 A1 | 1/2019 | Weagle |
| 2019/0039681 A1 | 2/2019 | Weagle |
| 2019/0047658 A1 | 2/2019 | Weagle |
| 2019/0061865 A1 | 2/2019 | Weagle |
| 2019/0061866 A1 | 2/2019 | Weagle |
| 2019/0061867 A1 | 2/2019 | Weagle |
| 2019/0061868 A1 | 2/2019 | Weagle |
| 2019/0168838 A1 | 6/2019 | Weagle |

FOREIGN PATENT DOCUMENTS

| | | |
|---|---|---|
| CH | 63758 A | 2/1914 |
| CN | 302966622 S | 10/2014 |
| CN | 303438302 S | 11/2015 |
| CN | 303584666 S | 2/2016 |
| CN | 303604532 S | 3/2016 |
| CN | 304240449 S | 8/2017 |
| CN | 304327156 S | 10/2017 |
| DE | 1084599 B | 6/1960 |
| DE | 1122392 B | 1/1962 |
| DE | 3133576 A1 | 5/1983 |
| DE | 3223728 A1 | 12/1983 |
| DE | 8906328 U1 | 11/1989 |
| DE | 3833880 A1 | 4/1990 |
| DE | 4119339 A1 | 1/1992 |
| DE | 9404873 U1 | 5/1994 |
| DE | 9403640 U1 | 6/1994 |
| DE | 9414705 U1 | 2/1995 |
| DE | 19503047 A1 | 8/1996 |
| DE | 19635939 A1 | 6/1997 |
| DE | 19633692 A1 | 2/1998 |
| DK | 49600 C | 12/1934 |
| EP | 0032170 B1 | 2/1986 |
| EP | 0030306 B1 | 4/1986 |
| EP | 0125244 B1 | 1/1987 |
| EP | 0399615 A2 | 11/1990 |
| EP | 420610 B1 | 2/1996 |
| EP | 726198 A2 | 8/1996 |
| EP | 0731017 B1 | 10/1997 |
| EP | 0941916 A1 | 9/1999 |
| EP | 0992374 A1 | 4/2000 |
| EP | 1049618 B1 | 9/2003 |
| EP | 728093 B2 | 11/2005 |
| EP | 02000398 A2 | 12/2008 |
| EP | 01884455 B1 | 4/2009 |
| EP | 2096024 A1 | 9/2009 |
| EP | 2100807 A1 | 9/2009 |
| EP | 2357098 A2 | 8/2011 |
| EP | 02001733 B1 | 12/2012 |
| EP | 2483141 B1 | 11/2013 |
| EP | 02913257 A1 | 9/2015 |
| FR | 347724 A | 3/1905 |
| FR | 353990 A | 9/1905 |
| FR | 350269 A | 12/1905 |
| FR | 376759 A | 8/1907 |
| FR | 467213 A | 6/1914 |
| FR | 547006 A | 11/1922 |
| FR | 559088 A | 9/1923 |
| FR | 28240 E | 1/1925 |
| FR | 636211 A | 4/1928 |
| FR | 902973 A | 9/1945 |
| FR | 972653 A | 2/1951 |
| FR | 1030006 A | 6/1953 |
| FR | 1032268 A | 6/1953 |
| FR | 1059922 A | 3/1954 |
| FR | 1064265 A | 5/1954 |
| FR | 1067221 A | 6/1954 |
| FR | 1082316 A | 12/1954 |
| FR | 2418742 A1 | 9/1979 |
| FR | 2494208 A2 | 5/1982 |
| FR | 2687976 A1 | 9/1993 |
| FR | 2687976 B1 | 5/1994 |
| FR | 3004415 A1 | 10/2014 |
| GB | 166065 A | 7/1921 |
| GB | 223638 A | 10/1924 |
| GB | 238069 A | 8/1925 |
| GB | 239848 A | 12/1925 |
| GB | 258141 A | 9/1926 |
| GB | 264003 A | 1/1927 |
| GB | 279630 A | 11/1927 |
| GB | 302026 A | 12/1928 |
| GB | 322370 A | 12/1929 |
| GB | 469697 A | 7/1937 |
| GB | 585122 A | 1/1947 |
| GB | 585904 A | 2/1947 |
| GB | 586372 A | 3/1947 |
| GB | 691551 A | 5/1953 |
| GB | 717259 A | 10/1954 |
| GB | 720093 A | 12/1954 |
| GB | 824866 A | 12/1959 |
| GB | 841523 A | 7/1960 |
| GB | 1540824 A | 2/1979 |
| GB | 1545403 A | 5/1979 |
| GB | 2038736 A | 7/1980 |
| GB | 2052407 A | 1/1981 |
| GB | 2073680 A | 10/1981 |
| GB | 2106843 A | 4/1983 |
| JP | 63-112191 U | 7/1988 |
| JP | 649887 U | 1/1989 |
| JP | 1204884 A | 8/1989 |
| JP | 5069875 A | 3/1993 |
| JP | 05-020635 Y2 | 5/1993 |
| JP | 1999091671 A | 4/1999 |
| JP | 2000159170 A | 6/2000 |
| JP | 2000159171 A | 6/2000 |
| JP | 2000159177 A | 6/2000 |
| JP | 2000159178 A | 6/2000 |
| JP | 2000168666 A | 6/2000 |
| TW | 416920 B | 1/2001 |
| TW | 568054 U | 12/2003 |
| TW | 596028 | 6/2004 |
| TW | D111693 | 7/2006 |
| TW | M335458 U | 7/2008 |
| TW | M354565 U | 4/2009 |
| TW | D140125 | 4/2011 |
| TW | D149623 | 10/2012 |
| WO | WO-82/00445 A1 | 2/1982 |
| WO | WO-84/00526 A1 | 2/1984 |
| WO | WO-87/01670 A1 | 3/1987 |
| WO | WO-95/23728 A1 | 9/1995 |
| WO | WO-97/46443 A1 | 12/1997 |
| WO | WO-00/013961 A1 | 3/2000 |

OTHER PUBLICATIONS

Color photograph of Armstrong bicycle, Applicant Admitted Prior Art, Applicant's Internal Files.

Black and white photograph of Scorpion motorcycle, Applicant Admitted Prior Art, Applicant's internal files.

Black and white photograph of Silencer motorcycle, Applicant Admitted Prior Art, Applicant's internal files.

Color Photograph of a Cotton TC-70 motorcycle, Applicant Admitted Prior Art, Applicant's internal files.

Black and white photograph of Greeves trials machine, Applicant Admitted Prior Art, Applicant's internal files.

International Search Report and Written Opinion for Application No. PCT/US2018/043412, dated Oct. 8, 2018.

Copending U.S. Appl. No. 16/125,085, filed Sep. 7, 2018.
Copending U.S. Appl. No. 16/141,277, filed Sep. 25, 2018.
Copending U.S. Appl. No. 16/141,323, filed Sep. 25, 2018.
Copending U.S. Appl. No. 16/141,887, filed Sep. 25, 2018.
Copending U.S. Appl. No. 16/141,916, filed Sep. 25, 2018.
Copending U.S. Appl. No. 16/153,396, filed Oct. 5, 2018.
Copending U.S. Appl. No. 16/159,069, filed Oct. 12, 2018.
Copending U.S. Appl. No. 16/159,104, filed Oct. 12, 2018.
Copending U.S. Appl. No. 16/159,169, filed Oct. 12, 2018.
Copending U.S. Appl. No. 16/159,252, filed Oct. 12, 2018.
Copending U.S. Appl. No. 16/161,804, filed Oct. 16, 2018.

* cited by examiner

SUSPENSION ASSEMBLY FOR A CYCLE

FIELD OF THE INVENTION

The disclosure is generally directed to cycles, and more specifically directed to cycles having a suspension assembly that improves stability.

BACKGROUND

Recently, telescopic front suspension forks have dominated suspension systems for two-wheeled vehicles. A telescopic fork includes sliding stantions connected in a steerable manner to a cycle frame, and at the same time, includes a telescoping mechanism for wheel displacement. Sliding stantions require very tight manufacturing tolerances, so expensive round centerless ground stantions are almost always used in high performance telescopic forks. Outer surfaces of the stantion typically slide against bushings to allow for compliance, and in many designs, the inner surfaces of the stantions slide against a damper or air spring piston to absorb shocks.

Front suspension for a cycle is subject to large bending forces fore and aft and less significant lateral forces. The typically round stantions in a telescopic fork must be sized to support the greatest loads encountered by the suspension during operation, which are typically in the fore/aft direction. This requires the use of large section or diameter stantions. The larger the stantions, the greater the area of the supporting bushings and sliding surfaces. Because of the stacked layout, multiple redundant sliding surfaces must be used to seal in oil and air, as well as provide ample structural support.

Because telescopic forks have relatively large stantions, and relatively large siding surfaces and seals, large break-away friction in the system (known as stiction) is generated by these components. Stiction resists compression of the suspension in reaction to bumps, which is a drawback in a suspension product where the goal is to react to road conditions, for example by deflecting in response to ground conditions, and/or absorbing impact from bumps. Additionally, as the telescopic fork is loaded in the fore/aft direction (usually on impact or braking), the bushings bind, resulting in even greater stiction at the exact moment when a rider needs the most compliance.

The higher the fore/aft load on the telescopic fork, the less effective the telescopic fork is at absorbing bumps. Most modern telescopic forks for cycles and motorcycles exhibit around 130 Newtons of stiction at their best, and thousands of Newtons of stiction when exposed to fore/aft loads.

Additionally, in the telescopic fork, mechanical trail is constrained by steering axis (head tube) angle and fork offset, a term for the perpendicular distance between the wheel rotation axis and the steering axis. Another problem with telescopic fork architecture is that when they are installed, mechanical trail reduces as the suspension is compressed, which reduces stability. When mechanical trail reduces, as the suspension compresses, less torque is required to steer the front wheel, causing a feeling of instability. This instability is a flaw in the telescopic fork. However, because most riders of 2-wheeled vehicles grew up only riding telescopic forks, they only know this feeling and nothing else. Thus, the inherent instability of a telescopic fork is the accepted normal.

Another drawback of the telescopic fork is their lack of a leverage ratio. Telescopic forks compress in a linear fashion in response to bumps. The wheel, spring, and damper all move together at the same rate because they are directly attached to each other. Because the fork compresses linearly, and because the spring and damper are connected directly to the wheel, the leverage ratio of wheel to damper and spring travel is a constant 1:1.

Yet another drawback of telescopic forks is that angle of attack stability and stiction increase and oppose one another. In other words, as angle of attack stability increases, stiction also increases, which is undesirable. This problem is caused by the rearward angle of the fork stantions. The less steeply (slacker) the fork stantions are angled, the better the angle of attack is in relation to oncoming bumps. However, because the fork angle is largely governed by the steering axis (head tube) angle of the cycle's frame the sliding stantions develop increased bushing load, and greater bending, resulting in increased stiction when slacker fork angles are used.

A further drawback of telescopic forks is called front suspension dive. When a rider applies the front brake, deceleration begins and the rider's weight transfers towards the front wheel, increasing load on the fork. As the telescopic front fork dives (or compresses) in response, the suspension stiffens, and traction reduces. This same load transfer phenomenon happens in most automobiles as well, but there is a distinction with a telescopic fork.

The undesirable braking reaction in a cycle telescopic fork is made up of two components, load transfer and braking squat. Load transfer, occurs when the rider's weight transfers forward during deceleration. That weight transfer causes an increased load on the front wheel, which compresses the front suspension. Braking squat is measured in the front suspension kinematics, and can have a positive, negative, or zero value. This value is independent of load transfer, and can have an additive or subtractive effect to the amount of fork dive present during braking. A positive value (known as pro-dive) forcibly compresses the front suspension when the brakes are applied, cumulative to the already present force from load transfer. A zero value has no braking reaction at all; the front suspension is free to respond naturally to the effects of load transfer (for better or worse). A negative value (known as anti-dive) counteracts the front suspension's tendency to dive by balancing out the force of load transfer with a counteracting force.

With a telescopic fork, the only possible braking squat reaction is positive. Any time that the front brake is applied, the rider's weight transfers forward, and additionally, the positive pro-dive braking squat reaction forcibly compresses the suspension. Effectively, this fools the front suspension into compressing farther than needed, which reduces available travel for bumps, increases spring force, and reduces traction.

The inherent disadvantages of telescopic forks are not going away. In fact, as technology has improved in cycling, the speeds and loads that riders are putting into modern cycles, bicycles, motorcycles, and mountain cycles only make the challenges for the telescopic fork greater.

SUMMARY

In accordance with one exemplary aspect, a suspension assembly for a cycle includes a steering fork having steering axis and a first arm. The first arm has a first end and a second end, and includes a first arm fixed pivot and a first arm shock pivot. The suspension assembly also includes a shock link having a shock link fixed pivot and a shock link floating pivot spaced apart from one another. The shock link is operatively connected to the first arm fixed pivot at the shock link fixed pivot such that the shock link is rotatable, pivotable, or bendable about the shock link fixed pivot and the shock link fixed pivot remains in a fixed location relative to the first arm while the shock link floating pivot is movable relative to the first arm. The suspension assembly also includes a shock absorber having a first shock mount and a second shock mount, the first shock mount being operatively connected to the first arm shock pivot and the second shock mount being operatively connected to a shock connection pivot located between the shock link fixed pivot and the shock link floating pivot along a length of the shock link. The suspension assembly also includes a wheel carrier having a wheel carrier first pivot and a wheel carrier second pivot spaced apart from one another along a length of the wheel carrier. A wheel mount on the wheel carrier is adapted to be connected to a wheel and the wheel carrier first pivot is operatively connected to the shock link floating pivot so that the wheel carrier second pivot is rotatable, pivotable, flexible or bendable about the wheel carrier first pivot relative to the shock link floating pivot. The suspension assembly also includes a control link having a control link floating pivot and a control link fixed pivot. The control link floating pivot is operatively connected to the wheel carrier second pivot, and the control link fixed pivot is operatively connected to the first arm control pivot such that the control link floating pivot is rotatable, pivotable, flexible, or bendable about the control link fixed pivot, which remains in a fixed location relative to the first arm control pivot. The fixed pivots and the floating pivots are arranged in a trailing configuration where each of the fixed pivots is forward of the corresponding floating pivot in the forward direction of travel. A mechanical trail distance, which is a distance between a ground contact point of a wheel connected to the wheel mount and the steering axis, increases as the suspension assembly compresses relative to a fully extended state.

DETAILED DESCRIPTION

The present invention is not to be limited in scope by the specific embodiments described below, which are intended as exemplary illustrations of individual aspects of the invention. Functionally equivalent methods and components fall within the scope of the invention. Indeed, various modifications of the invention, in addition to those shown and described herein, will become apparent to those skilled in the art from the foregoing description. Such modifications are intended to fall within the scope of the appended claims. Throughout this application, the singular includes the plural and the plural includes the singular, unless indicated otherwise. All cited publications, patents, and patent applications are herein incorporated by reference in their entirety.

As used herein, the terms "suspension assembly compression" and "suspension assembly displacement" are used interchangeably. The terms "suspension assembly compression" and "suspension assembly displacement" refer to movement and articulation of the suspension assembly during compression and extension of the shock absorber. More specifically, these terms refer to the component of movement, in a direction parallel to a steering axis, of the individual links and pivots of the suspension assembly. Even more specifically, these terms refer to the movement of the wheel mount, on a wheel carrier of the suspension assembly, in a direction parallel to the steering axis. Furthermore, the suspension assemblies described below are illustrated in fully extended, partially compressed, and further compressed states, which also refer to corresponding relative displacements of the suspension assembly (e.g., no displacement, partial displacement, and further displacement). It should be understood that a rider would only experience riding a cycle that is in a fully compressed state for a very short period of time (on the order of milliseconds) as the suspension assembly will naturally and substantially instantaneously equilibrate to a state with less compression than the fully compressed state as the suspension assembly responds to changing riding conditions.

Figure 1A:
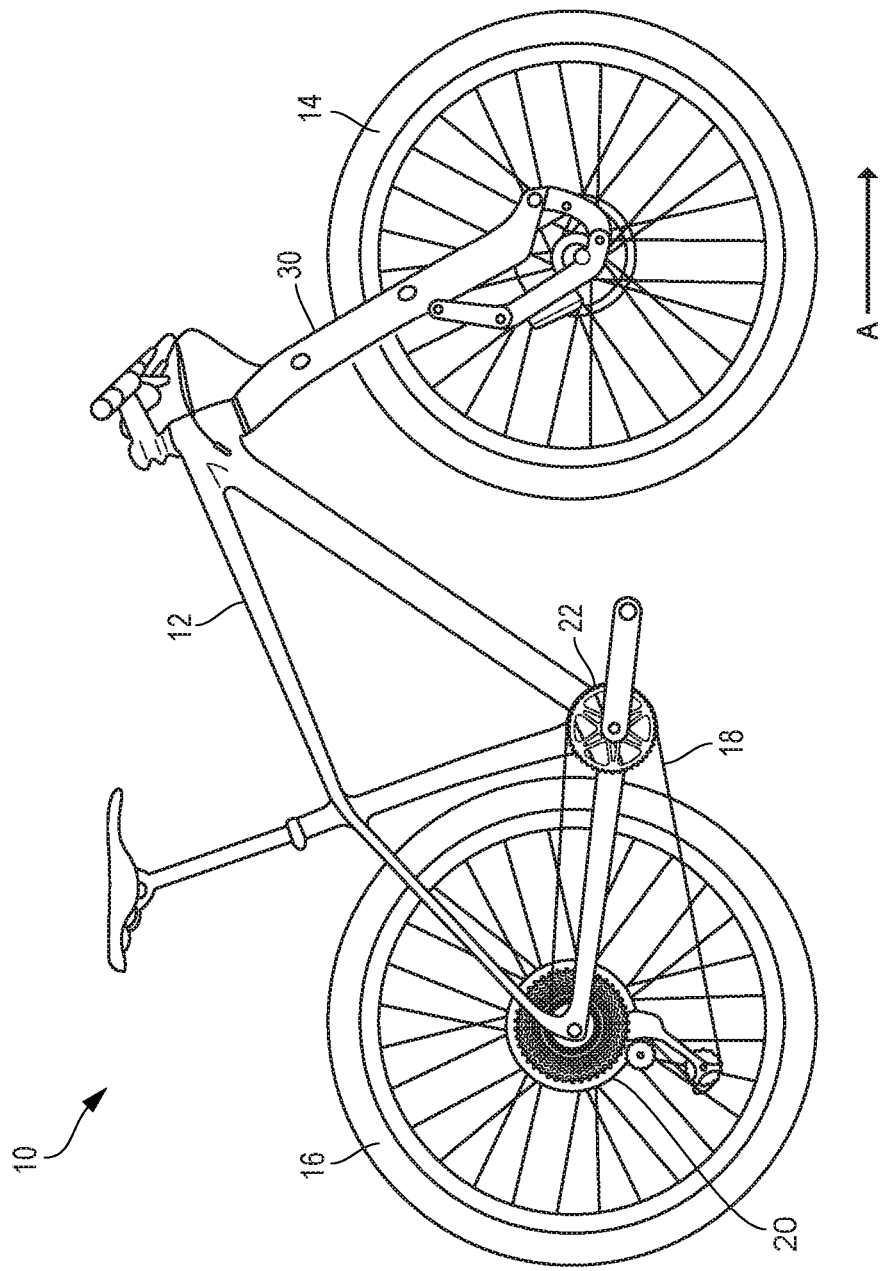
FIG. 1A is a side view of a cycle including a front wheel suspension assembly constructed according to the teachings of the disclosure.

Turning now to FIG. 1A, a cycle 10 includes a frame 12, a front wheel 14 rotatably connected to a fork 30, which can be bifurcated or single sided, and a rear wheel 16 rotatably connected to the frame 12. The rear wheel 16 is drivable by a drive mechanism, such as a chain 18 connected to a wheel sprocket 20 and to a chainring 22, so that driving force may be imparted to the rear wheel 16. The fork 30, allows the front wheel 14 to deflect in response to ground conditions as a rider rides the cycle and to improve handling and control during riding. To improve handling characteristics, the fork 30 and the front wheel 14 may be operatively connected to a suspension assembly or linkage 46. The frame 12 may optionally include a rear wheel suspension assembly (not shown in FIG. 1A), which may allow the rear wheel 16 to deflect in response to ground conditions as a rider rides the cycle and to improve handling and control during riding.

Figure 1B:
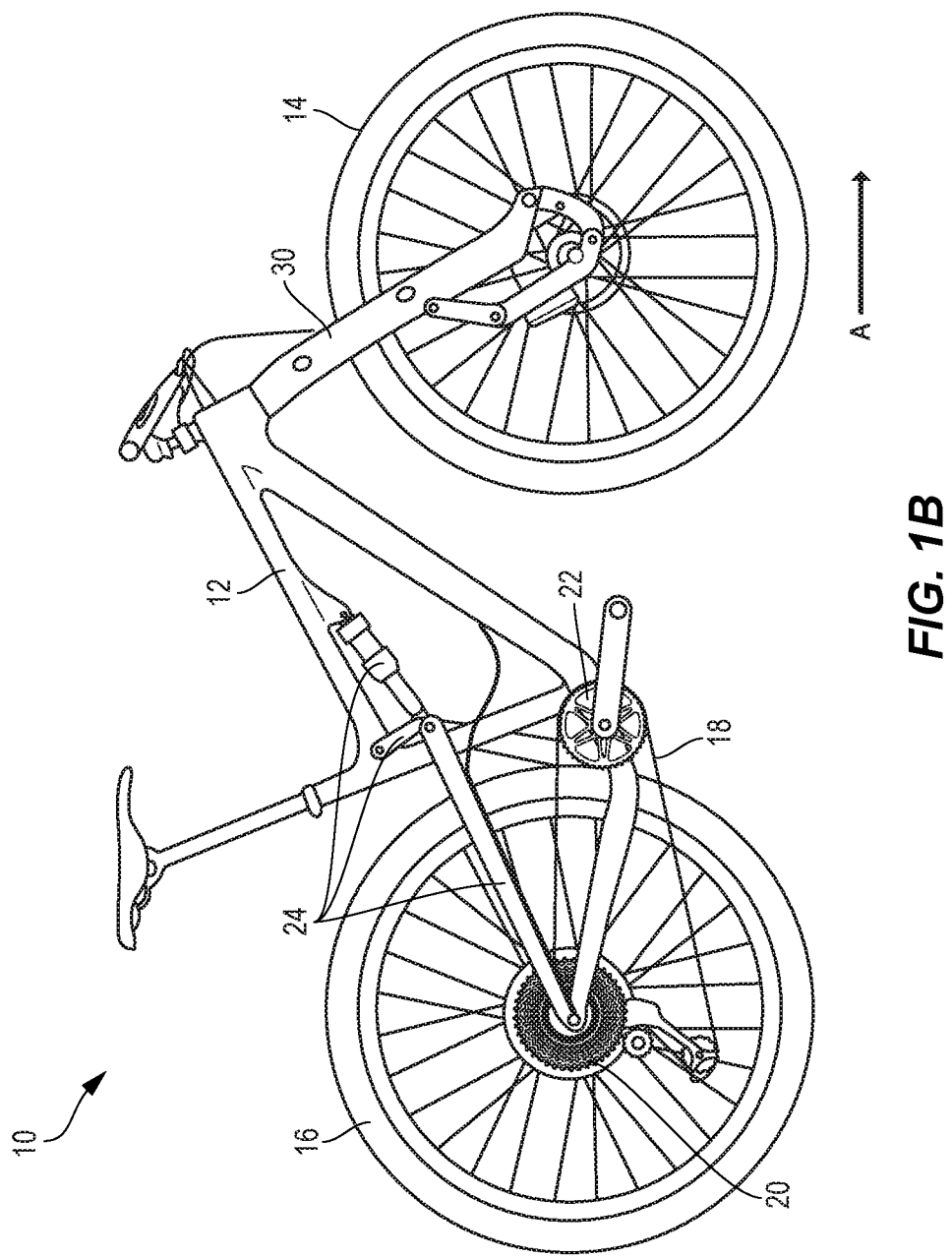
FIG. 1B is a side view of an alternate embodiment of a cycle including a front wheel suspension assembly constructed according to the teachings of the disclosure, the cycle of FIG. 1B including a rear wheel suspension assembly.

Turning now to FIG. 1B, a cycle 10 includes a frame 12, a front wheel 14 rotatably connected to a fork 30, which can be bifurcated or single sided, and a rear wheel 16 rotatably connected to the frame 12. The fork 30 and the front wheel 14 may be operatively connected to a suspension assembly or linkage 46. The rear wheel 16 is drivable by a drive mechanism, such as a chain 18 connected to a wheel sprocket 20 and to a chainring 22, so that driving force may be imparted to the rear wheel 16. The fork 30, allows the front wheel 14 to deflect in response to ground conditions as a rider rides the cycle and to improve handling and control during riding. The frame 12 may optionally include a rear wheel suspension assembly 24, which may allow the rear wheel 16 to deflect in response to ground conditions as a rider rides the cycle and to improve handling and control during riding.

Figure 2:
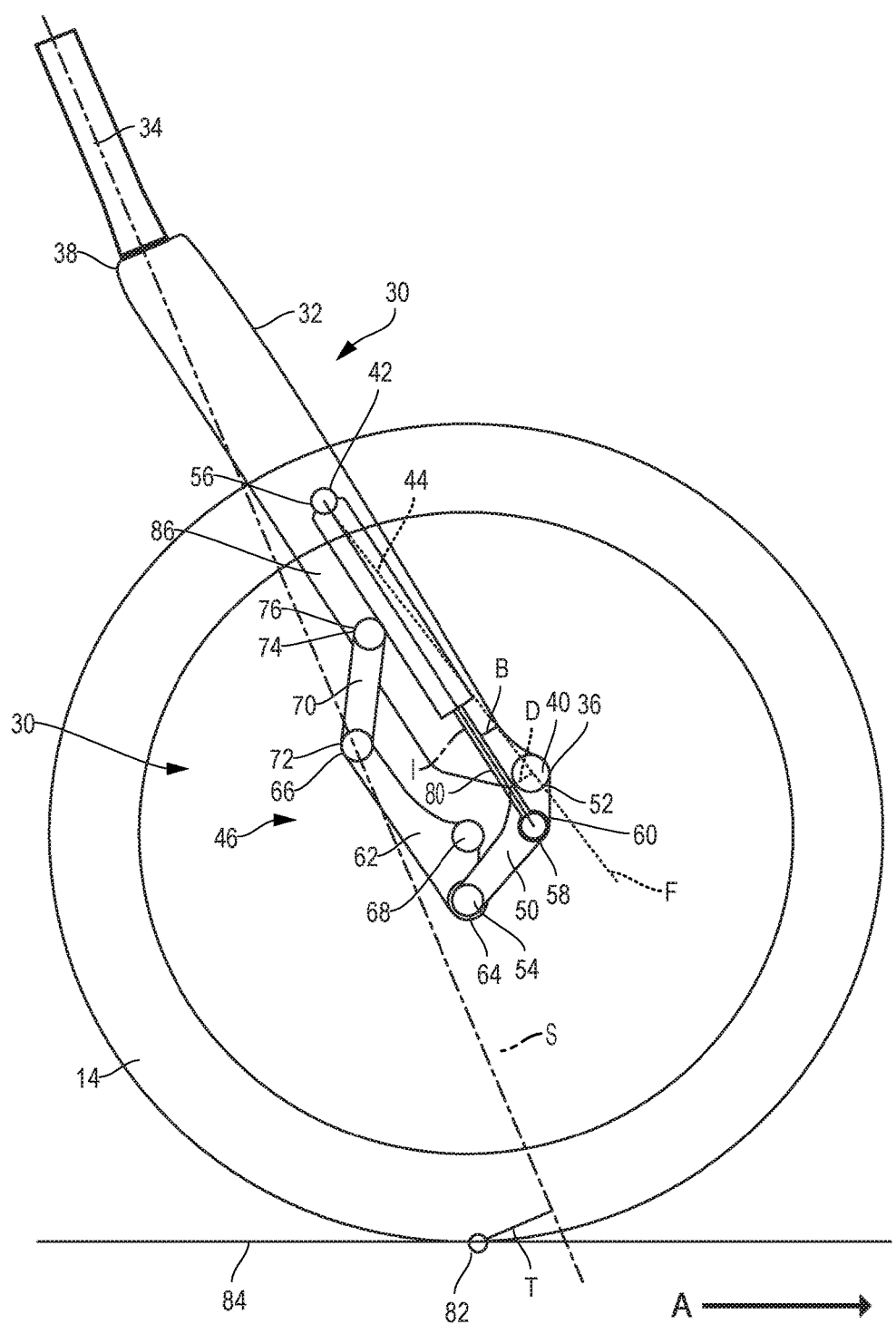
FIG. 2 is a close up side view of the front wheel suspension assembly of FIG. 1.
Figure 3:
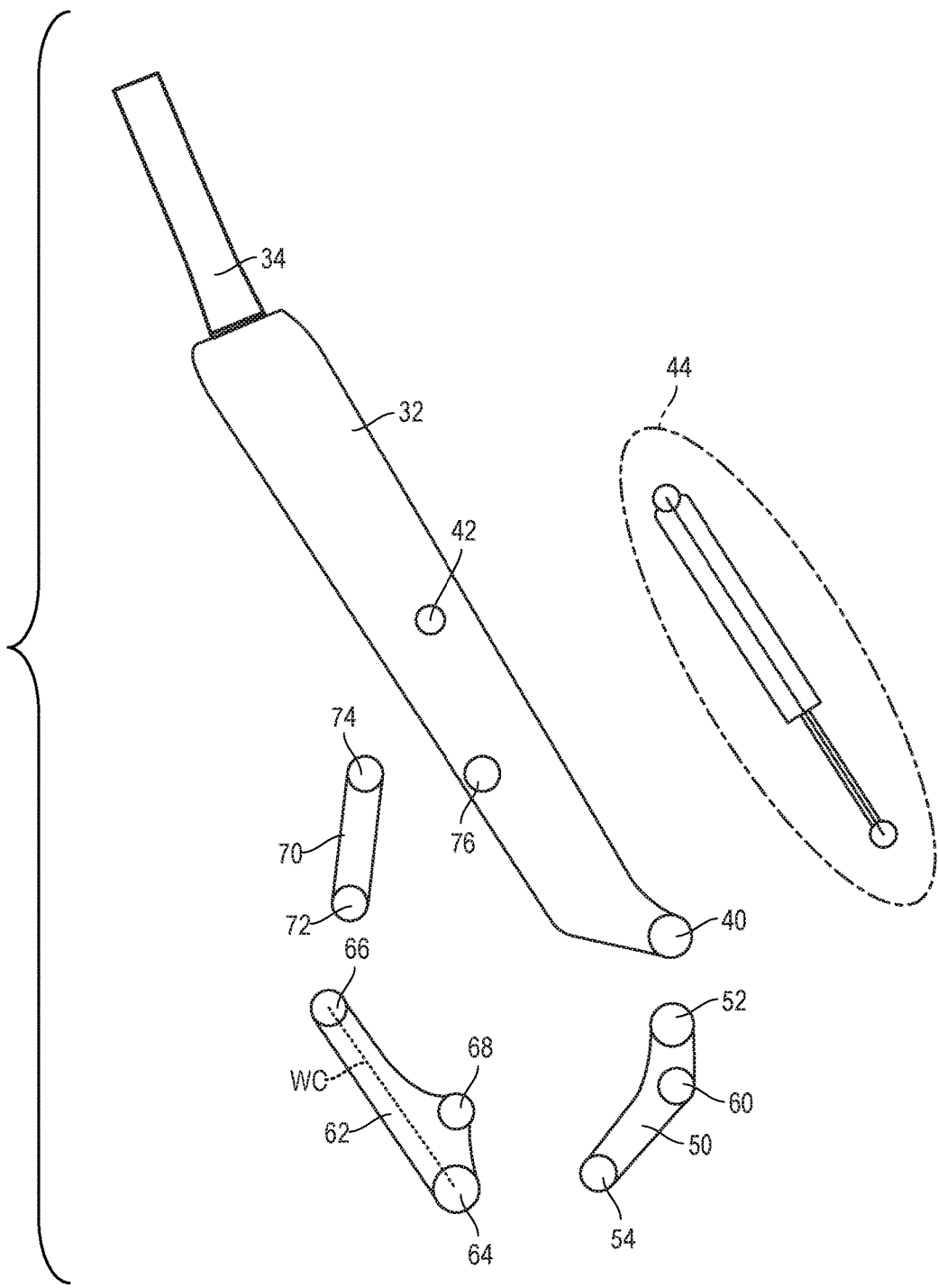
FIG. 3 is a side exploded view of the front wheel suspension assembly of FIG. 2.
Figure 4:
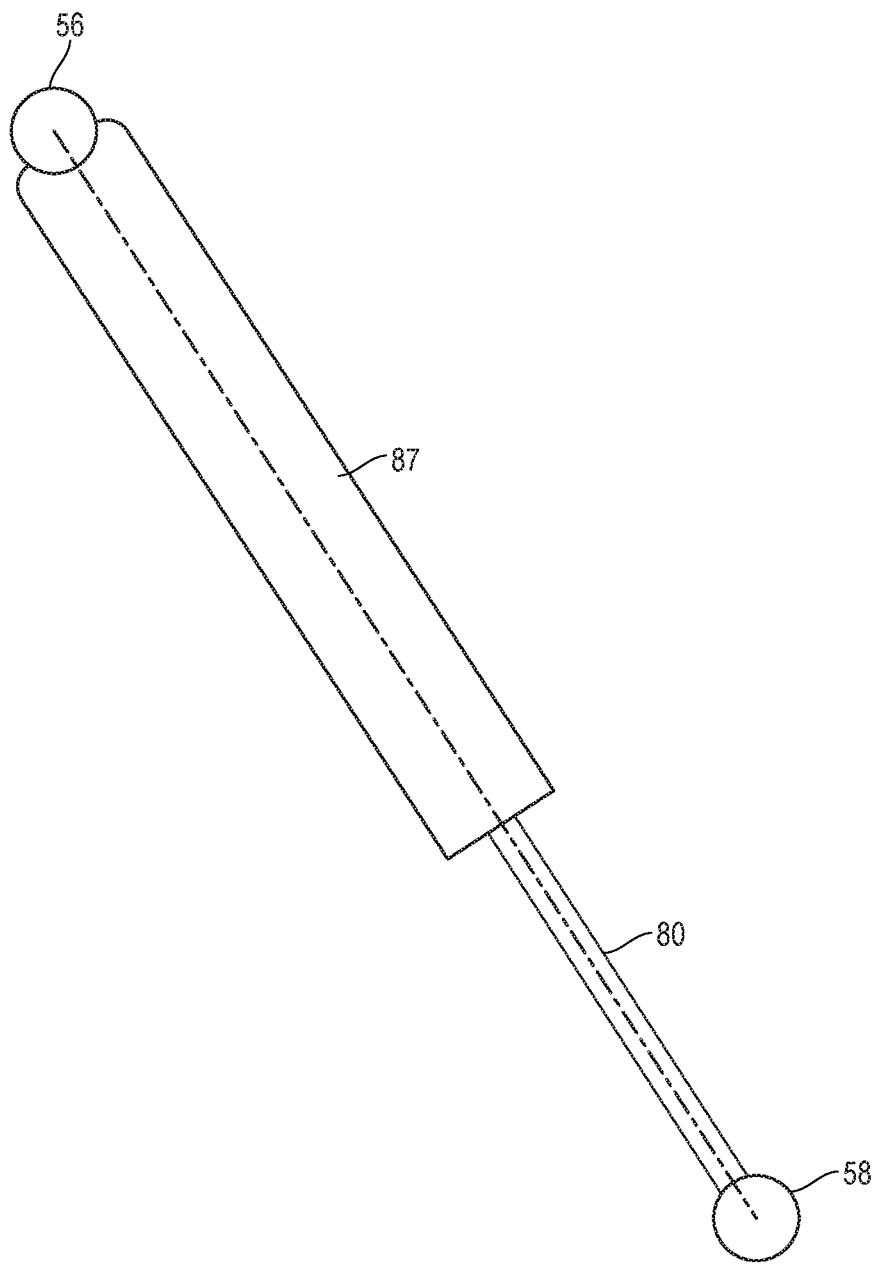
FIG. 4 is a side cut-away view of a shock absorber of the wheel suspension assembly of FIG. 2.

As illustrated in FIGS. 2-4, the fork 30 includes steering fork having a first arm 32 operatively connected to a steering shaft 34. The steering shaft 34 includes a steering axis S that is formed by a central axis of the steering shaft 34. The first arm 32 has a first end and 36 a second end 38, the first arm 32 including a first arm fixed pivot 40 and a first arm shock pivot 42. The first arm shock pivot 42 operably connects a suspension device, such as a shock absorber 44 to the first arm 32. For example, the first arm shock pivot 42 allows relative motion, in this case rotation, between the shock absorber 44 and the first arm 32. In other embodiments, other types of relative motion, such as flexure or translation, between the shock absorber 44 and the first arm 32 may be employed. The first arm fixed pivot 40 pivotably connects one element of the linkage 46, as discussed further below, to the first arm 32.

A shock link 50 is pivotably connected to the first arm fixed pivot 40. The shock link 50 includes a shock link fixed pivot 52 and a shock link floating pivot 54 spaced apart from one another along a length of the shock link 50. The shock link 50 is pivotably connected to the first arm fixed pivot 40 at the shock link fixed pivot 52 such that the shock link 50 is rotatable about the shock link fixed pivot 52 and the shock link fixed pivot 52 remains in a fixed location relative to the first arm 32, while the shock link floating pivot 54 is movable relative to the first arm 32.

A pivot, as used herein, includes any connection structure that may be used to operatively connect one element to another element, and that allows relative movement between the connected components. An operative connection may allow for one component to move in relation to another while constraining movement in one or more degrees of freedom. For example, the one degree of freedom may be pivoting about an axis. In one embodiment, a pivot may be formed from a journal or through hole in one component and an axle in another component. In other examples, pivots may include ball and socket joints. Yet other examples of pivots include, but are not limited to singular embodiments and combinations of, compliant mounts, sandwich style mounts, post mounts, bushings, bearings, ball bearings, plain bearings, flexible couplings, flexure pivots, journals, holes, pins, bolts, and other fasteners. Also, as used herein, a fixed pivot is defined as a pivotable structure that does not change position relative the first arm 32. As used herein, a floating pivot is defined as a pivot that is movable (or changes position) relative to another element, and in this case, is movable relative to first arm 32.

The suspension assembly or linkage 46 is configured in a trailing orientation. A trailing orientation is defined herein as a linkage that includes a fixed pivot that is forward of the corresponding floating pivot when the cycle is traveling in the forward direction of travel as represented by arrow A in FIGS. 1A and 1B. In other words, the floating pivot trails the fixed pivot when the cycle is traveling in the forward direction of travel. For example, in the illustrated embodiment, the shock link fixed pivot 52 is forward of the shock link floating pivot 54. The disclosed suspension assembly or linkage 46 is also characterized as a multi-link suspension assembly. A multi-link suspension assembly is defined herein as a suspension assembly having a plurality of interconnected links in which any part of the front wheel 14 is directly connected to a link in the plurality of interconnected links that is not directly connected to the fork 30.

The shock absorber 44 includes a first shock mount 56 and a second shock mount 58, the first shock mount 56 being pivotably connected to the first arm shock pivot 42, the second shock mount 58 being pivotably connected to a shock connection pivot 60 located between the shock link fixed pivot 52 and the shock link floating pivot 54 along a length of the shock link 50.

A wheel carrier 62 includes a wheel carrier first pivot 64 and a wheel carrier second pivot 66 spaced apart from one another along a length of the wheel carrier 62. Both the wheel carrier first pivot 64 and the wheel carrier second pivot 66 are floating pivots, as they both move relative to the first arm 32. A wheel mount 68 is adapted to be connected to a center of a wheel, for example the front wheel 14. In the disclosed embodiment, a center of the front wheel 14 is rotatably connected to the wheel mount 68. The wheel carrier first pivot 64 is pivotably connected to the shock link floating pivot 54 so that the wheel carrier second pivot 66 is pivotable about the wheel carrier first pivot 64 relative to the shock link floating pivot 54.

A control link 70 includes a control link floating pivot 72 and a control link fixed pivot 74. The control link floating pivot 72 is pivotably connected to the wheel carrier second pivot 66, and the control link fixed pivot 74 is pivotably connected to a first arm control pivot 76 located on the first arm 32 such that the control link floating pivot 72 is pivotable about the control link fixed pivot 74, which remains in a fixed location relative to the first arm control pivot 76.

In some embodiments, the shock connection pivot 60 is closer to the shock link fixed pivot 52 than to the shock link floating pivot 54, as illustrated in FIGS. 2 and 3. As a function of suspension compression and link movement, a perpendicular distance D between a central axis I of an inshaft 80 of the shock absorber 44 and a center of the shock link fixed pivot 52 varies as the shock absorber 44 is compressed and extended, as the shock absorber pivots about the first shock mount 56. This pivoting and varying of the perpendicular distance D allows the leverage ratio and motion ratio to vary as the shock absorber 44 compresses and extends. As a function of suspension compression and link movement, a mechanical trail distance T varies as the shock absorber 44 compresses and extends. The mechanical trail distance T is defined as the perpendicular distance between the steering axis S and the contact point 82 of the front wheel 14 with the ground 84. More specifically, as the suspension compresses, beginning at a state of full extension, the mechanical trail distance T increases, thus increasing stability during compression. Compression is usually experienced during braking, cornering, and shock absorbing, all of which benefit from increased stability that results from the mechanical trail distance increase.

Mechanical trail (or "trail", or "caster") is an important metric relating to handling characteristics of two-wheeled cycles. Mechanical trail is a configuration in which the wheel is rotatably attached to a fork, which has a steering axis that is offset from the contact point of the wheel with the ground. When the steering axis is forward of the contact point, as in the case of a shopping cart, this configuration allows the caster wheel to follow the direction of cart travel. If the contact point moves forward of the steering axis (for example when reversing direction of a shopping cart), the directional control becomes unstable and the wheel spins around to the original position in which the contact point trails the steering axis. The friction between the ground and the wheel causes a self-righting torque that tends to force the wheel to trail the steering axis. The greater the distance between the contact point and perpendicular to the steering axis, the more torque is generated, and the greater the stability of the system. Similarly, the longer the distance between the cycle wheel contact point and perpendicular to the steering axis, the more torque is generated, and the greater the stability of the system. Conversely, the shorter the distance between the cycle wheel contact point and perpendicular to the steering axis, the less torque is generated, and the lower the stability of the system.

This caster effect is an important design characteristic in cycles. Generally, the caster effect describes the cycle rider's perception of stability resulting from the mechanical trail distance described above. If the wheel gets out of line, a self-aligning torque automatically causes the wheel to follow the steering axis again due to the orientation of the wheel ground contact point being behind the steering axis of the fork. As the contact point of the wheel with the ground is moved further behind the steering axis, self aligning torque increases. This increase in stability is referred to herein as the caster effect.

In the disclosed wheel suspension assembly, when the suspension is at a state of full extension, the steering axis of the fork 30 projects ahead of the contact point 82. As the suspension assembly moves towards a state of full compression, the steering axis S projects farther ahead of the contact point 82, which results in the stability increasing. This increased stability stands in contrast to known telescopic fork cycles, which experience reduced trail and thus reduced stability during compression.

Leverage ratios or motion ratios are important metrics relating to performance characteristics of some suspensions. In certain embodiments, a shock absorber can be compressed at a constant or variable rate as the suspension moves at a constant rate towards a state of full compression. As a wheel is compressed, incremental suspension compression distance measurements are taken. Incremental suspension compression distance is measured from the center of the wheel at the wheel rotation axis and parallel with the steering axis, starting from a state of full suspension extension, and moving towards a state of full suspension compression. These incremental measurements are called the incremental suspension compression distance. A shock absorber length can be changed by wheel link, and/or brake link, and/or control link movements as the suspension compresses. At each incremental suspension compression distance measurement, a shock absorber length measurement is taken. The relationship between incremental suspension compression distance change and shock absorber length change for correlating measurements of the suspension's compression is called leverage ratio or motion ratio. Leverage ratio and motion ratio are effectively equivalent but mathematically different methods of quantifying the effects of variable suspension compression distance versus shock compression distance. Overall leverage ratio is the average leverage ratio across the entire range of compression. Overall leverage ratio can be calculated by dividing the total suspension compression distance by the total shock absorber compression distance. Overall motion ratio is the average motion ratio across the entire range of compression. Overall motion ratio can be calculated by dividing the total shock absorber compression distance by the total suspension compression distance.

Generally, a suspended wheel has a compressible wheel suspension travel distance that features a beginning travel state where the suspension is completely uncompressed to a state where no further suspension extension can take place, and an end travel state where a suspension is completely compressed to a state where no further suspension compression can take place. At the beginning of the wheel suspension travel distance, when the suspension is in a completely uncompressed state, the shock absorber is in a state of least compression, and the suspension is easily compressed. As the suspended wheel moves compressively, force at the wheel changes in relation to shock absorber force multiplied by a leverage ratio. A leverage ratio is defined as the ratio of compressive wheel travel change divided by shock absorber measured length change over an identical and correlating given wheel travel distance. A motion ratio is defined as the ratio of shock absorber measured length change divided by compressive wheel travel change over an identical and correlating given wheel travel distance.

In known telescopic forks no leverage ratio exists and, the leverage ratio is always equivalent to 1:1 due to the direct coupling of the wheel to the shock absorber.

A leverage ratio curve is a graphed quantifiable representation of leverage ratio versus wheel compression distance or percentage of full compression distance. Wheel compression distance, suspension compression, or wheel travel is measured from the center of the wheel at the wheel rotation axis and parallel with the steering axis, with the initial 0 percent measurement taken at full suspension extension with the vehicle unladen. As a suspension is compressed from a state of full extension to a state of full compression at a constant rate, measurements of shock absorber length are taken as the shortest distance between a first shock pivot and a second shock pivot at equal increments of suspension compression. When graphed as a curve on a Cartesian graph, leverage ratio is shown on the Y axis escalating from the x axis in a positive direction, and vertical wheel travel is shown on the X axis escalating from the Y axis in a positive direction.

A motion ratio curve is a graphed quantifiable representation of motion ratio versus wheel compression distance or percentage of full compression distance. Wheel compression distance, suspension compression, or wheel travel is measured from the center of the wheel at the wheel rotation axis and parallel with the steering axis, with the initial 0 percent measurement taken at full suspension extension with the vehicle unladen. As a suspension is compressed from a state of full extension to a state of full compression, measurements of shock absorber length are taken as the shortest distance between a first shock pivot and a second shock pivot at equal increments of suspension compression. When graphed as a curve on a Cartesian graph, motion ratio is shown on the Y axis escalating from the x axis in a positive direction, and vertical wheel travel is shown on the X axis escalating from the Y axis in a positive direction.

In certain embodiments, a leverage ratio or motion ratio curve can be broken down into three equal parts in relation to wheel compression distance or vertical wheel travel, a beginning ⅓ (third), a middle ⅓, and an end ⅓. In certain embodiments, a beginning ⅓ can comprise a positive slope, zero slope, and or a negative slope. In certain embodiments, a middle ⅓ can comprise a positive slope, zero slope, and or a negative slope. In certain embodiments, an end ⅓ can comprise a positive slope, zero slope, and or a negative slope. Certain preferred leverage ratio embodiments can comprise a beginning ⅓ with a positive slope, a middle ⅓ with a less positive slope, and an end ⅓ with a more positive slope. Certain preferred leverage ratio embodiments can comprise a beginning ⅓ with a negative slope, a middle ⅓ with negative and zero slope, and an end ⅓ with a positive slope. Certain preferred leverage ratio embodiments can comprise a beginning ⅓ with a positive and negative slope, a middle ⅓ with negative and zero slope, and an end ⅓ with a positive slope. Certain preferred leverage ratio embodiments can comprise a beginning ⅓ with a positive and negative slope, a middle ⅓ with negative and zero slope, and an end ⅓ with a more negative slope. Certain preferred motion ratio embodiments can comprise a beginning ⅓ with a negative slope, a middle ⅓ with a less negative slope, and an end ⅓ with a more negative slope. Certain preferred motion ratio embodiments can comprise a beginning ⅓ with a positive slope, a middle ⅓ with positive and zero slope, and an end ⅓ with a negative slope. Certain preferred motion ratio embodiments can comprise a beginning ⅓ with a negative and positive slope, a middle ⅓ with positive and zero slope, and an end ⅓ with a negative slope. Certain preferred motion ratio embodiments can comprise a beginning ⅓ with a negative and positive slope, a middle ⅓ with positive and zero slope, and an end ⅓ with a more positive slope.

In contrast to telescopic suspensions, the disclosed wheel suspension assembly provides a greater than 1:1 overall leverage ratio between the shock absorber 44 and the shock link 50, due to the indirect coupling (through the linkage 46) of the wheel 14 and the shock absorber 44. In contrast to telescopic suspensions, the disclosed wheel suspension assembly provides a less than 1:1 overall motion ratio between the shock absorber 44 and the shock link 50, due to the indirect coupling (through the linkage 46) of the wheel 14 and the shock absorber 44. Additionally, because of the movement arcs of the various linkage elements, at any given point during compression, instantaneous leverage ratio and motion ratio can vary non-linearly.

The central axis I of the inshaft 80 of the shock absorber 44 is arranged to form an angle B of between 0° and 20° relative to a central axis F of the first arm 32, the central axis F of the first arm 32 being defined by a line formed between the first arm shock pivot 42 and the first arm fixed pivot 40. In other embodiments, the central axis I of the inshaft 80 of the shock absorber 44 forms an angle with the central axis F of the first arm 32 of between 0° and 15°. In other embodiments, the central axis I of the inshaft 80 of the shock absorber 44 forms an angle with the central axis F of the first arm 32 of between 0° and 30°. The angle B may vary within these ranges during compression and extension.

In some embodiments, the first arm 32 includes a hollow portion 86 and the shock absorber 44 is located at least partially within the hollow portion 86 of the first arm 32.

The shock link fixed pivot 52 is offset forward of the central axis I of the inshaft 80 of the shock absorber 44. In other words, the central axis I of the inshaft 80 of the shock absorber 44 is positioned between the shock link fixed pivot 52 and the shock link floating pivot 54 in a plane defined by the central axis I of the inshaft 80, the shock link fixed pivot 52 and the shock link floating pivot 54 (i.e., the plane defined by the view of FIG. 2).

A line between the wheel carrier first pivot 64 and the wheel carrier second pivot 66 defines a wheel carrier axis WC, and the wheel mount 68 is offset from the wheel carrier axis WC in a plane defined by the wheel carrier axis WC and the wheel mount 68 (i.e., the plane defined by the view of FIG. 3). In some embodiments, the wheel mount 68 is offset from the wheel carrier axis WC towards the first arm 32, for example the embodiment illustrated in FIGS. 2 and 3. In other embodiments, the wheel mount 68 may be offset from the wheel carrier axis WC away from the first arm 32.

In the embodiment of FIGS. 2 and 3, the wheel mount 68 is located aft of the shock link fixed pivot 52, such that the central axis I of the inshaft 80 of the shock absorber 44 is located between the wheel mount 68 and the shock link fixed pivot 52 in a plane defined by the central axis I of the inshaft 80 of the shock absorber 44, the wheel mount 68 and the shock link fixed pivot 52 (i.e., the plane defined by the view of FIG. 2).

Turning now to FIG. 4, in some embodiments, the shock absorber 44 includes a shock body, in some embodiments comprising a spring and damper 87. The shock absorber may further include the inshaft 80 that extends from the shock body 87. The second shock mount 58 is formed at one end of the inshaft 80, and the inshaft 80 is pivotably connected to the shock connection pivot 60 by the second shock mount 58 such that the inshaft 80 is compressible and extendable relative to the shock body 87 as the shock link 50 pivots about the shock link fixed pivot 52.

Figure 5:
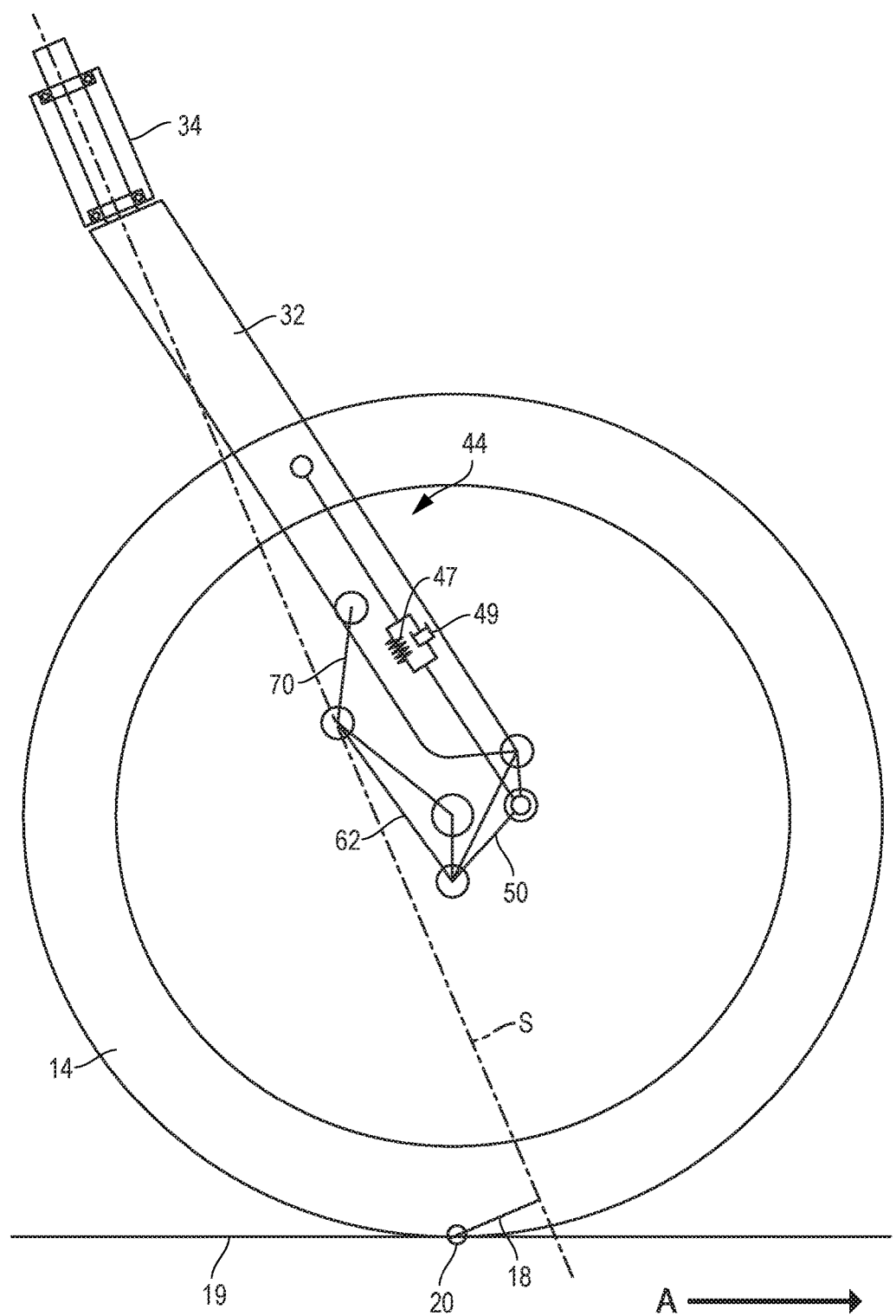
FIG. 5 is a side schematic view of an alternate embodiment of a wheel suspension assembly constructed according to the teachings of the disclosure.

FIG. 5 illustrates the wheel suspension assembly in engineering symbols that distinguish a spring 47 and dashpot 49 of the shock absorber 44.

Returning now to FIGS. 2-4, the control link 70 is pivotably mounted to the first arm 32 at the first arm control pivot 76 that is located between the first arm fixed pivot 40 and the first arm shock pivot 42, along a length of the first arm 32.

Turning now to FIGS. 6A-6D, several embodiments of structures are illustrated that may be used as the pivots (fixed and/or floating) described herein.

Figure 6A:
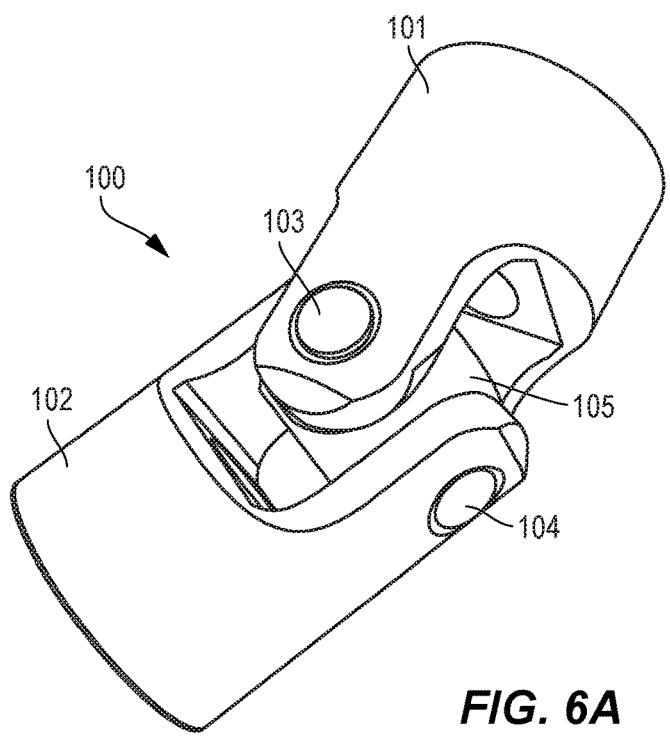
FIG. 6A is a perspective view of a first embodiment of a pivot of the wheel suspension assembly of FIG. 2.

FIG. 6A illustrates a cardan pivot 100. The cardan pivot includes a first member 101 and a second member 102 that are pivotably connected to one another by yoke 105 which comprises a first pin 103 and a second pin 104. As a result, the first member 101 and the second member 102 may move relative to one another about an axis of the first pin 103 and/or about an axis of the second pin 104.

Figure 6B:
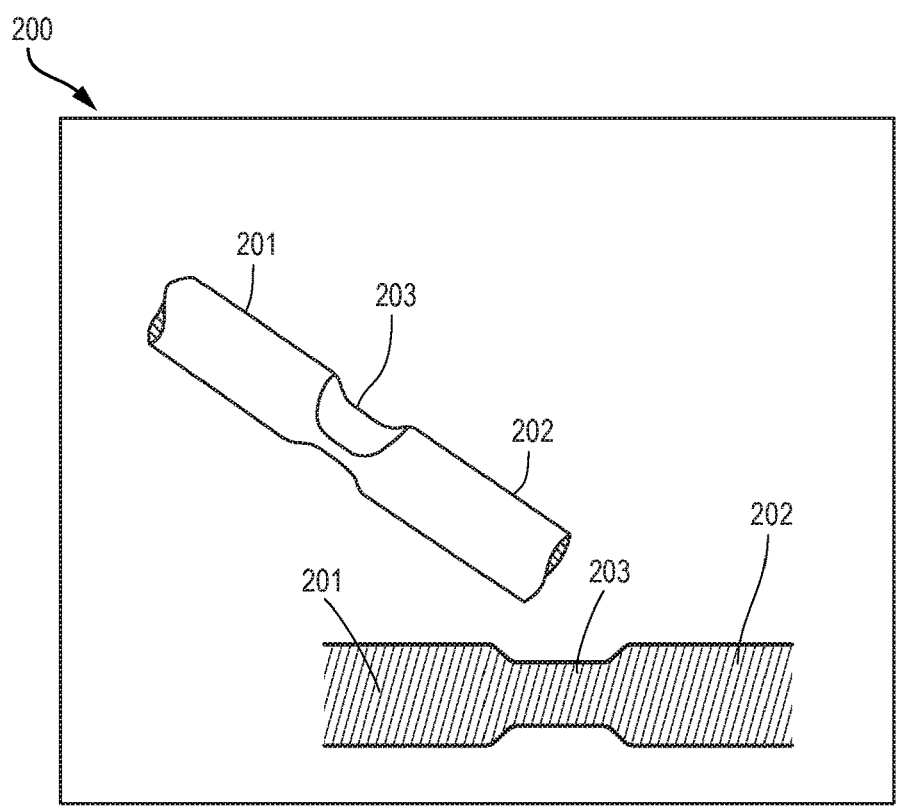
FIG. 6B is a side view of a second embodiment of a pivot of the wheel suspension assembly of FIG. 2.

FIG. 6B illustrates a flexure pivot 200. The flexure pivot 200 includes a flexible portion 203 disposed between a first member 201 and a second member 202. In the illustrated embodiment, the first member 201, the second member 202, and the flexible portion 203 may be integrally formed. In other embodiments, the first member 201, the second member 202, and the flexible portion 203 may be separate elements that are connected to one another. In any event, the flexible portion 203 allows relative motion between the first member 201 and the second member 202 about the flexible portion 203. The flexible portion 203 is more flexible than the members 201 and 202, permitting localized flexure at the flexible portion 203. In the illustrated embodiment, the flexible portion 203 is formed by a thinner portion of the overall structure. The flexible portion 203 is thinned sufficiently to allow flexibility in the overall structure. In certain embodiments, the flexible portion 203 is shorter than 100 mm. In certain embodiments, the flexible portion 203 is shorter than 70 mm. In certain embodiments, the flexible portion 203 is shorter than 50 mm. In certain embodiments, the flexible portion 203 is shorter than 40 mm. In certain preferred embodiments, the flexible portion 203 is shorter than 30 mm. In certain other preferred embodiments, the flexible portion 203 is shorter than 25 mm.

Figure 6C:
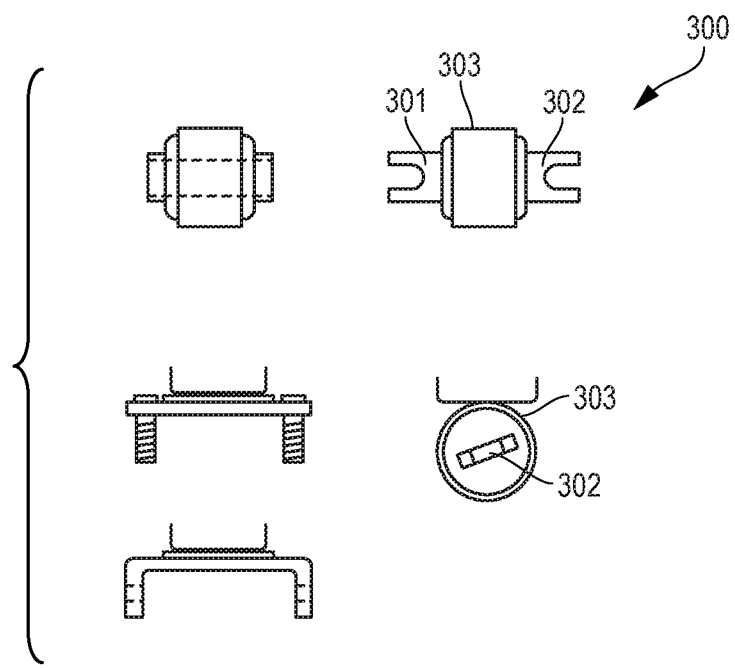
FIG. 6C is an exploded view of a third embodiment of a pivot of the wheel suspension assembly of FIG. 2.

FIG. 6C illustrates a bar pin pivot 300. The bar pin pivot includes a first bar arm 301 and a second bar arm 302 that are rotatably connected to a central hub 303. The central hub 303 allows the first bar arm 301 and the second bar arm 302 to rotate around a common axis.

Figure 6D:
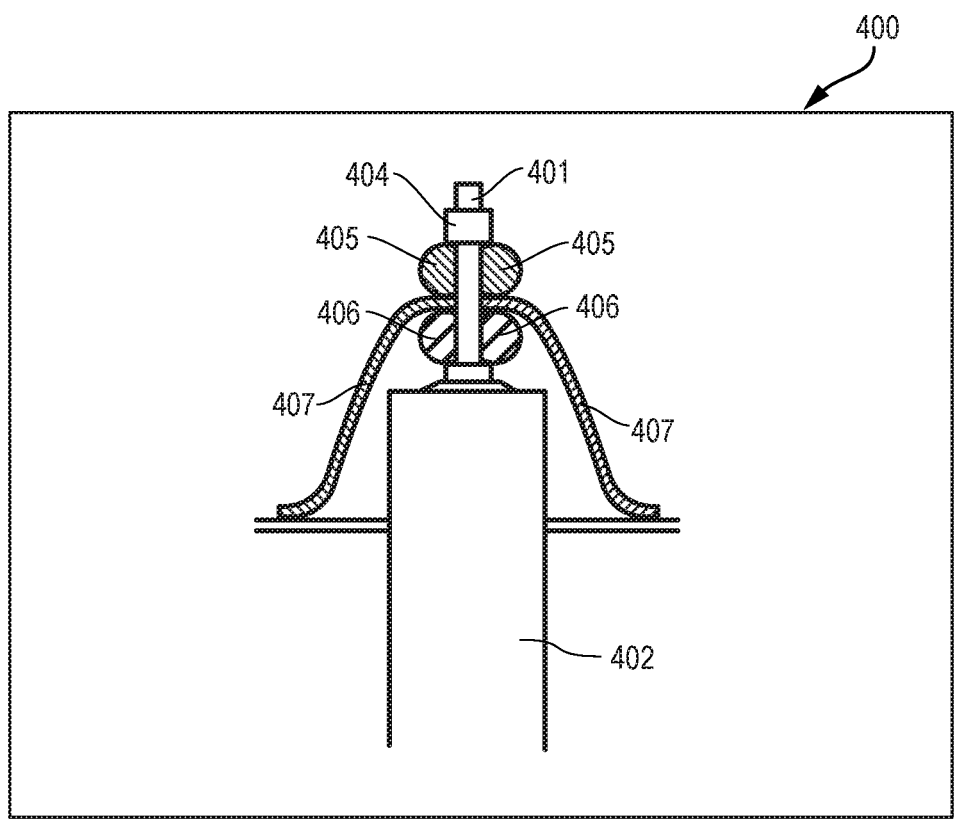
FIG. 6D is a side view of a fourth embodiment of a pivot of the wheel suspension assembly of FIG. 2.

FIG. 6D illustrates a post mount pivot 400. The post mount pivot 400 includes a mounting stem 401 that extends from a first shock member 402. The mounting stem 401 is connected to a structure 407 by a nut 404, one or more retainers 405, and one or more grommets 406. The first shock member 402 is allowed relative movement by displacement of the grommets 406, which allows the mounting stem 401 to move relative to a structure 407 in at least one degree of freedom.

Turning to FIGS. 7-12, generally, as the suspension assembly 46 initially compresses (e.g., one or more links in the suspension assembly has a component of movement in a direction 510 that is substantially parallel to the steering axis S), a mechanical trail distance T initially increases due to the angular change in the steering axis S, which projects a bottom of the steering axis forward, relative to the wheel contact point 82 with the ground 84. This increase in mechanical trail distance T also increases the caster effect by creating a larger moment arm, between the steering axis 82 and the wheel contact point 82, to correct off-center deflections of the wheel 14. As a result, the wheel 14 becomes more statically and dynamically stable as the suspension assembly 46 compresses and the mechanical trail distance T increases. For example, for each embodiment disclosed herein, when suspension assembly compression is initiated (relative to an uncompressed state), mechanical trail distance T increases. Mechanical trail distance T may increase, for example continuously increase, from a minimum value in the uncompressed state of the suspension assembly to a maximum value in a fully compressed state of the suspension assembly. In other embodiments, mechanical trail distance T may increase initially from the uncompressed state of the suspension assembly to a maximum value at a partially compressed intermediate state of the suspension assembly, and then mechanical trail distance T may decrease from the maximum value as the suspension assembly 46 continues compression from the partially compressed intermediate state to the fully compressed state.

Figure 7:
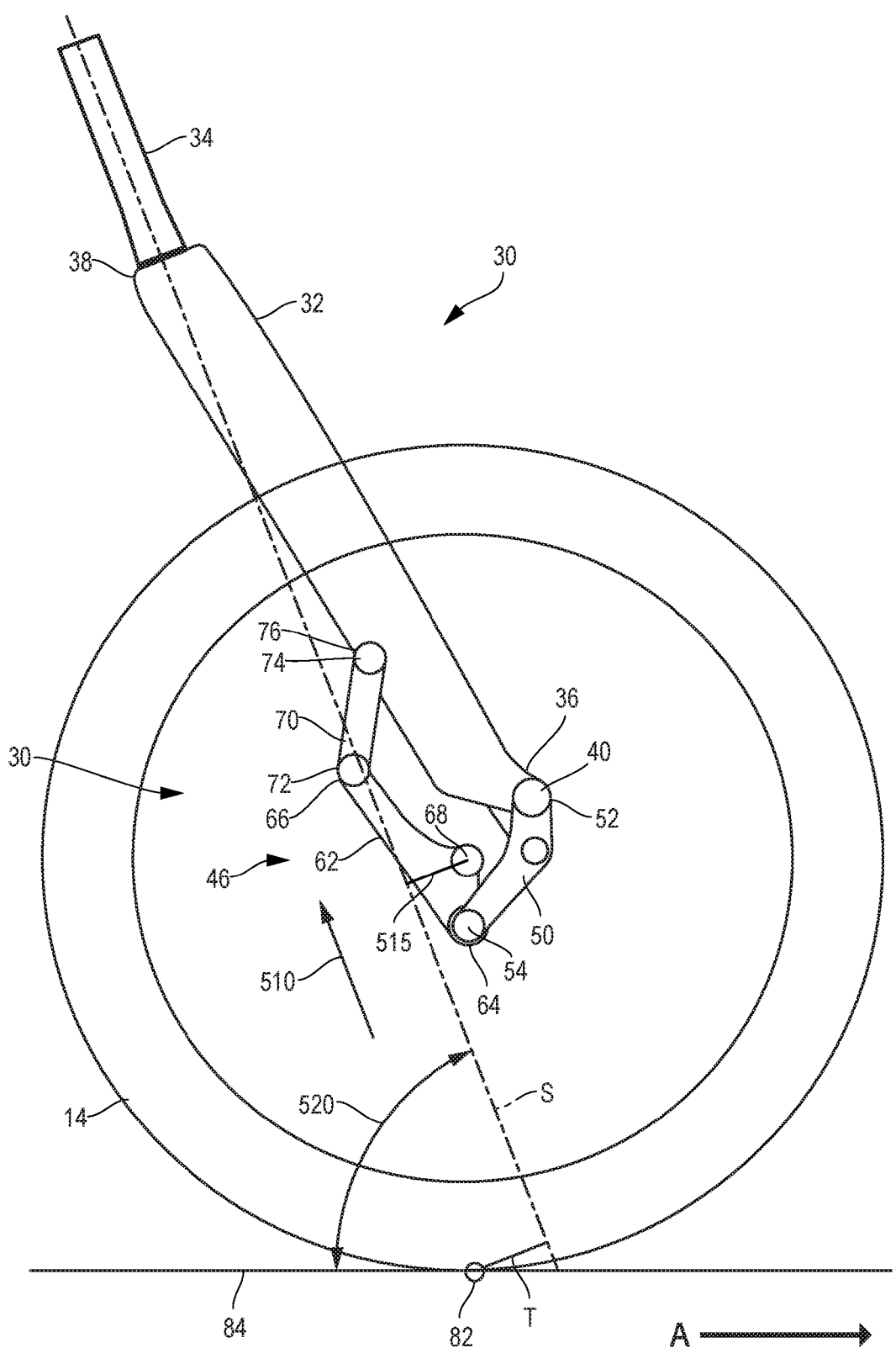
FIG. 7 is a close up side view of the first arm of the front wheel suspension assembly of FIG. 2 in a fully extended state.

When the disclosed suspension assembly 46 is at a fully extended state (e.g., uncompressed), as illustrated in FIG. 7, for example, the steering axis S projects ahead of the contact point 82, where the wheel 14 contacts the ground 84. In various states of compression between uncompressed and fully compressed, suspension assembly compression can be measured as a component of linear distance that the wheel mount 68 moves in a travel direction 510 aligned with and parallel to the steering axis S.

Figure 8:
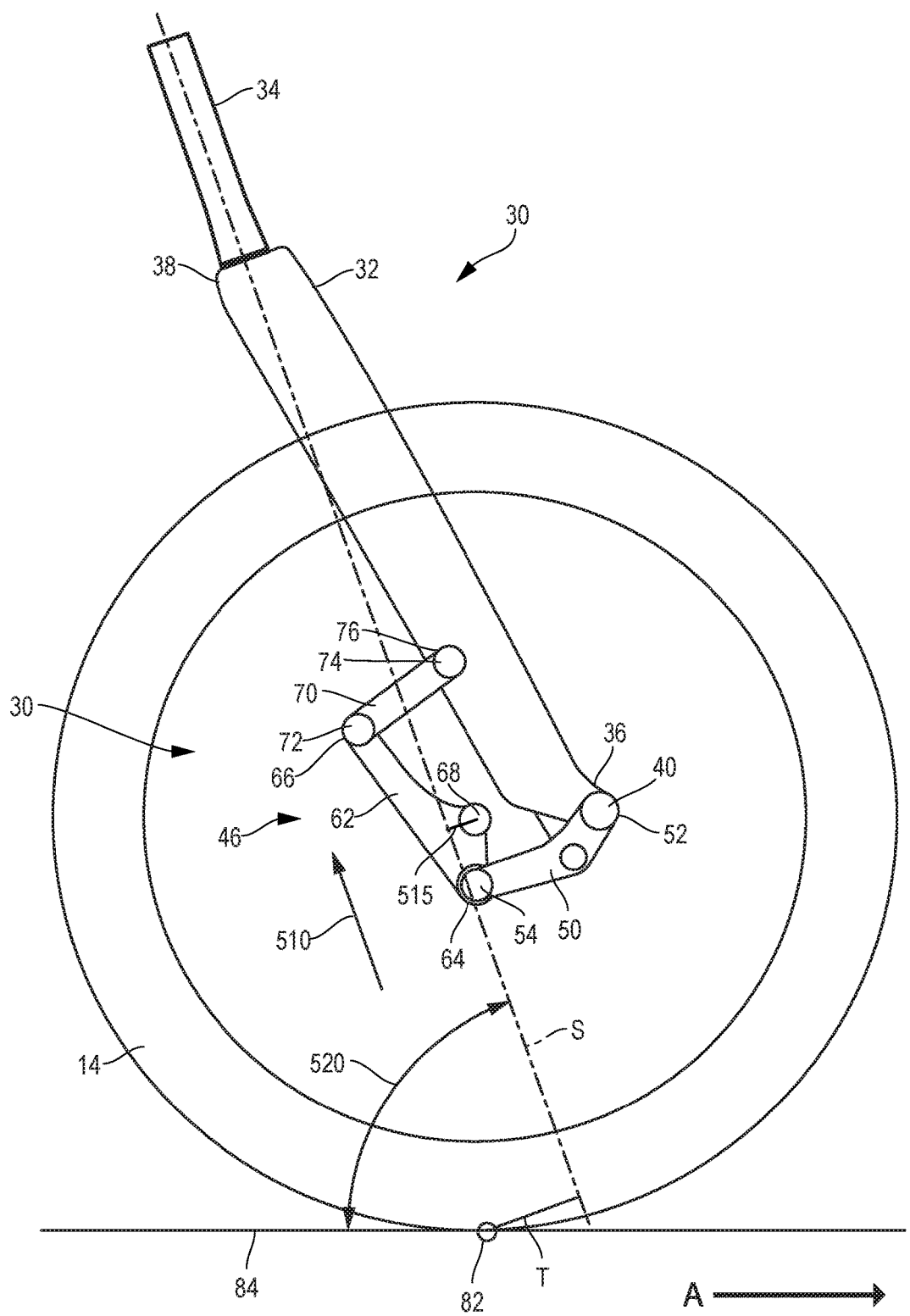
FIG. 8 is a close up side view of the first arm of the front wheel assembly of FIG. 2 in a partially compressed intermediate state.
Figure 9:
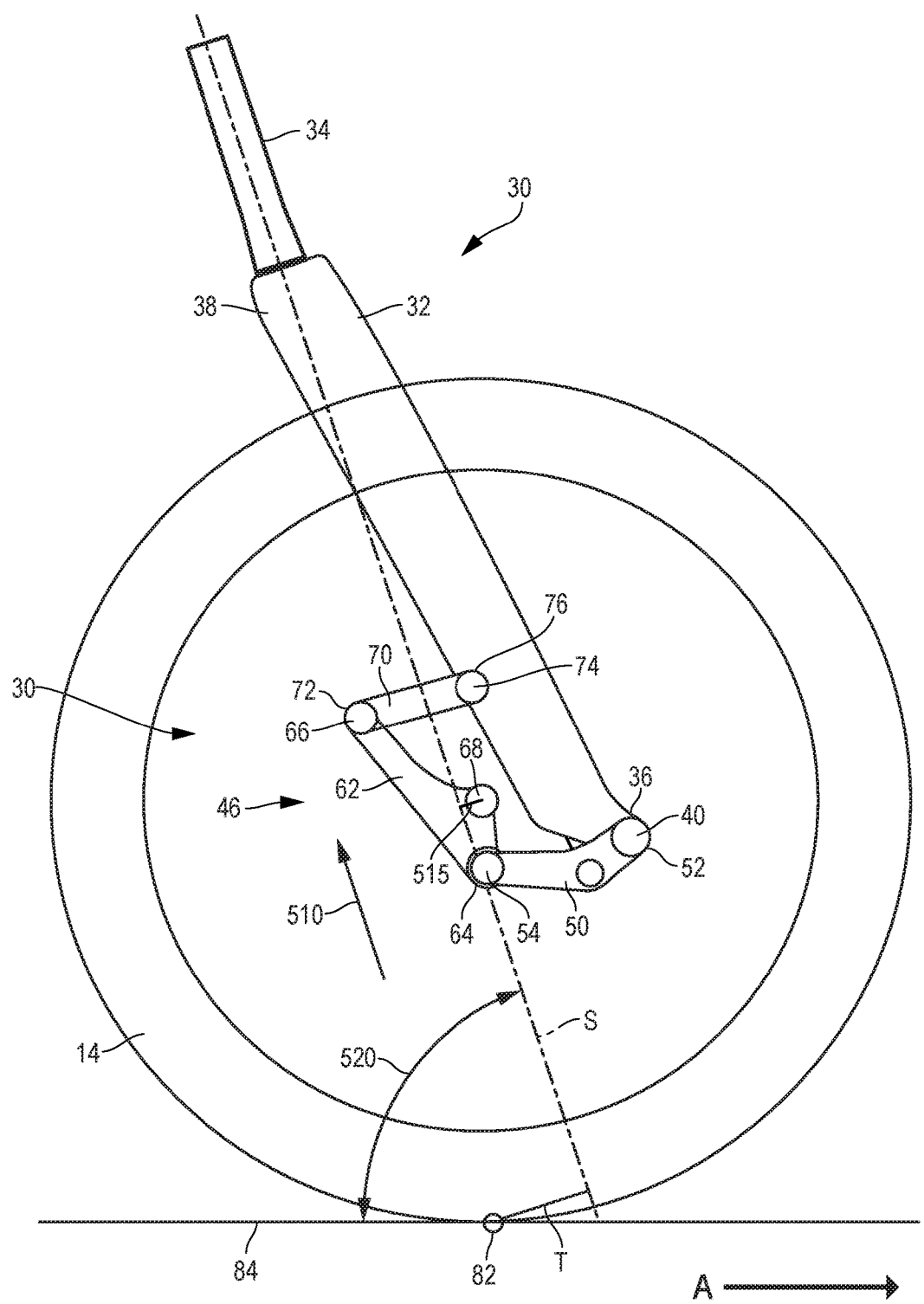
FIG. 9 is a close up side view of the first arm of the front wheel suspension assembly of FIG. 2 in a further compressed state.

As the suspension assembly 46 initially begins to compress, the suspension assembly 46 moves through a partially compressed intermediate state, as illustrated in FIG. 8. In the partially compressed intermediate state illustrated in FIG. 8, the steering axis S projects farther ahead of the contact point 82 than in the fully extended state of FIG. 7, which results in a decrease of an offset distance 515 of the wheel mount and a corresponding increase in the mechanical trail distance T. In the embodiment of FIGS. 7-9, the offset distance 515, which is defined as the perpendicular distance between the steering axis S and a center of the wheel mount 68 of the front wheel 14, decreases as the suspension assembly 46 compresses. The offset distance 515 generally decreases during suspension assembly compression because the wheel mount 68 moves in the aft direction, to the left in FIGS. 7-9. In other embodiments, for example in the embodiments of FIGS. 10-12, as the suspension assembly 46 compresses, beginning at a state of full extension, the offset distance 515 can increase or decrease (e.g., move forward or aft (right or left respectively in FIGS. 10-12) during suspension compression, depending on variables including wheel 14 diameter, steering angle 520, and initial mechanical trail distance T.

The mechanical trail distance T is larger in the partially compressed intermediate state of FIG. 8 than in the fully extended state of FIG. 7. This increase in mechanical trail distance T results in increased stability, as described above. This increased mechanical trail distance T, and corresponding increase in stability, is the opposite result of what happens when telescopic fork suspension assemblies compress, which is a reduced mechanical trail distance and thus, a reduction in stability. Increasing mechanical trail distance as the suspension assembly compresses is a significant performance advantage over existing suspension assemblies.

As stated above, the increase in mechanical trail distance T as the suspension assembly 46 compresses advantageously increases wheel stability due to the increased caster effect. Compression is usually experienced during challenging riding conditions, such as braking, cornering, and shock absorbing, all of which benefit from the advantageously increased stability that results from the mechanical trail distance increase observed in the disclosed front wheel suspension assemblies.

As the suspension assembly 46 moves towards a further compressed state, for example as illustrated in FIG. 9, the steering axis S projects even farther ahead of the contact point 82, which results in a further decrease of a wheel carrier displacement distance 515 and a corresponding further increase in the mechanical trail distance T. The mechanical trail distance T is larger in the further compressed state of FIG. 9 than in the fully extended state of FIG. 7 or than in the partially compressed intermediate state of FIG. 8. This increase in mechanical trail distance T results in further increased stability. In the embodiment of FIGS. 7-9, increased mechanical trail distance T, and thus increased stability, occur when the suspension assembly is in the further compressed state (FIG. 9). In some embodiments, the mechanical trail distance T may decrease between the further compressed state (FIG. 9) and a fully compressed state (not shown). In yet other embodiments, the mechanical trail distance T may continue to increase from the further compressed state (FIG. 9) to the fully compressed state (not shown).

As a function of suspension compression and link movement, the mechanical trail distance T, and the offset distance 515, vary as the suspension assembly compresses and extends. In some embodiments, the mechanical trail distance T may increase, for example continuously increase, from full extension to full compression. In some embodiments, the increase in mechanical trail distance T may occur at a non constant (e.g., increasing or decreasing) rate.

In yet other embodiments (e.g., the embodiment illustrated in FIGS. 10-12), the mechanical trail distance T may increase initially as the suspension assembly compresses to the partially compressed intermediate state (FIG. 11), which results in an increased mechanical trail distance T. The partially compressed intermediate state (FIG. 11) is a state of suspension assembly compression between the fully extended state (FIG. 10) and the further compressed state (FIG. 12).

Figure 10:
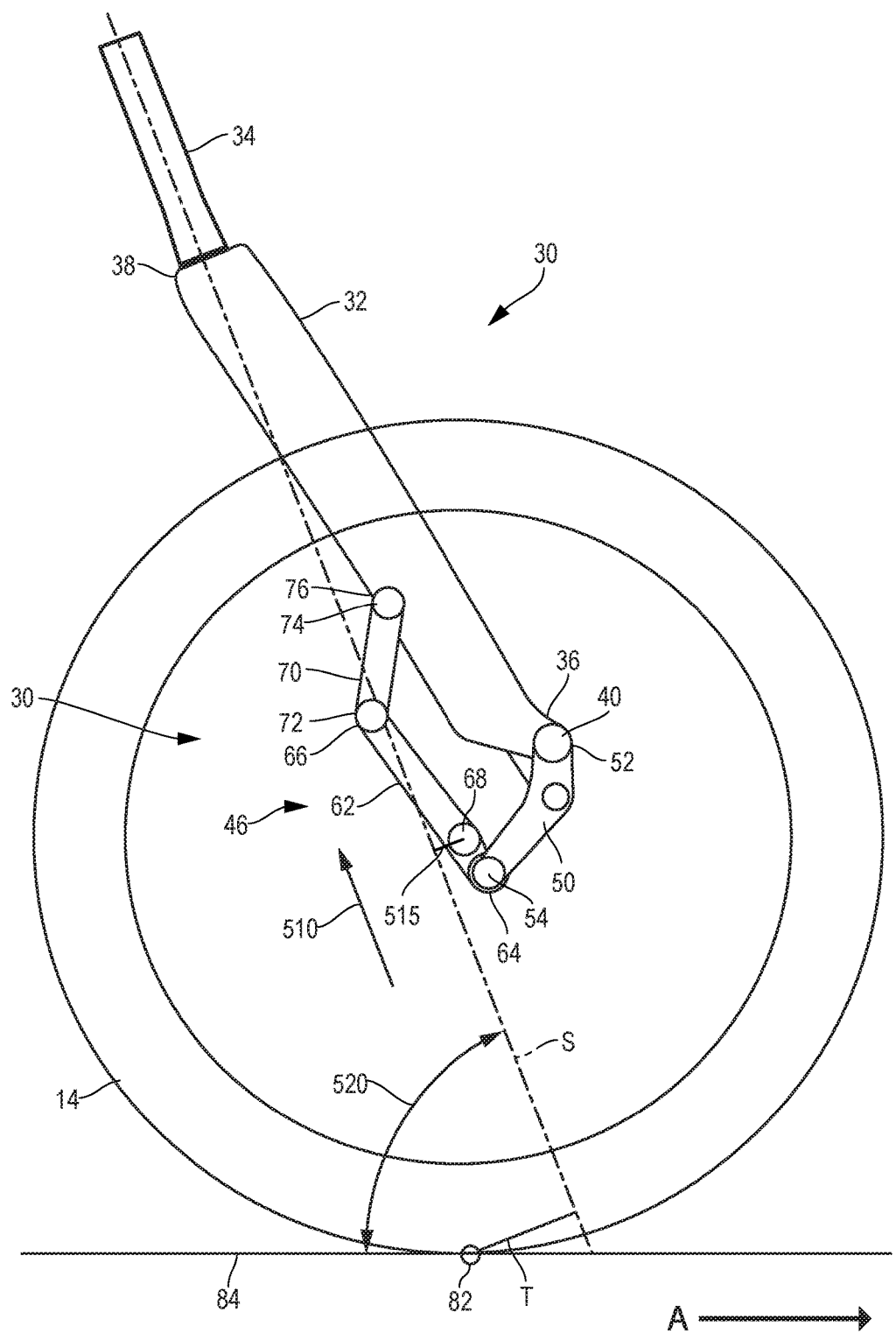
FIG. 10 is a close up side view of a first arm of an alternate embodiment of a front wheel suspension assembly in a fully extended state.
Figure 11:
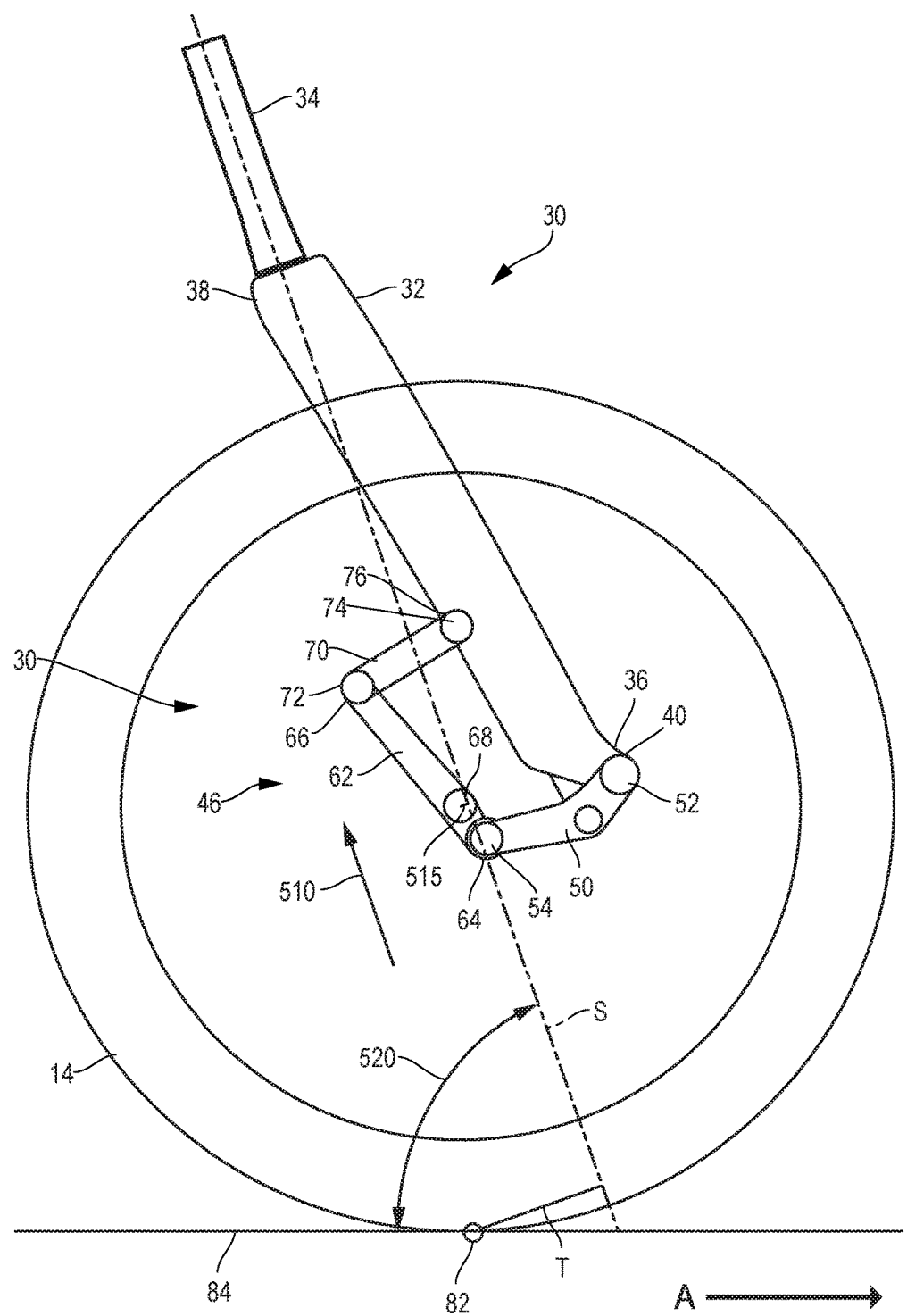
FIG. 11 is a close up side view of the first arm of the front wheel assembly of FIG. 10 in a partially compressed intermediate state.
Figure 12:
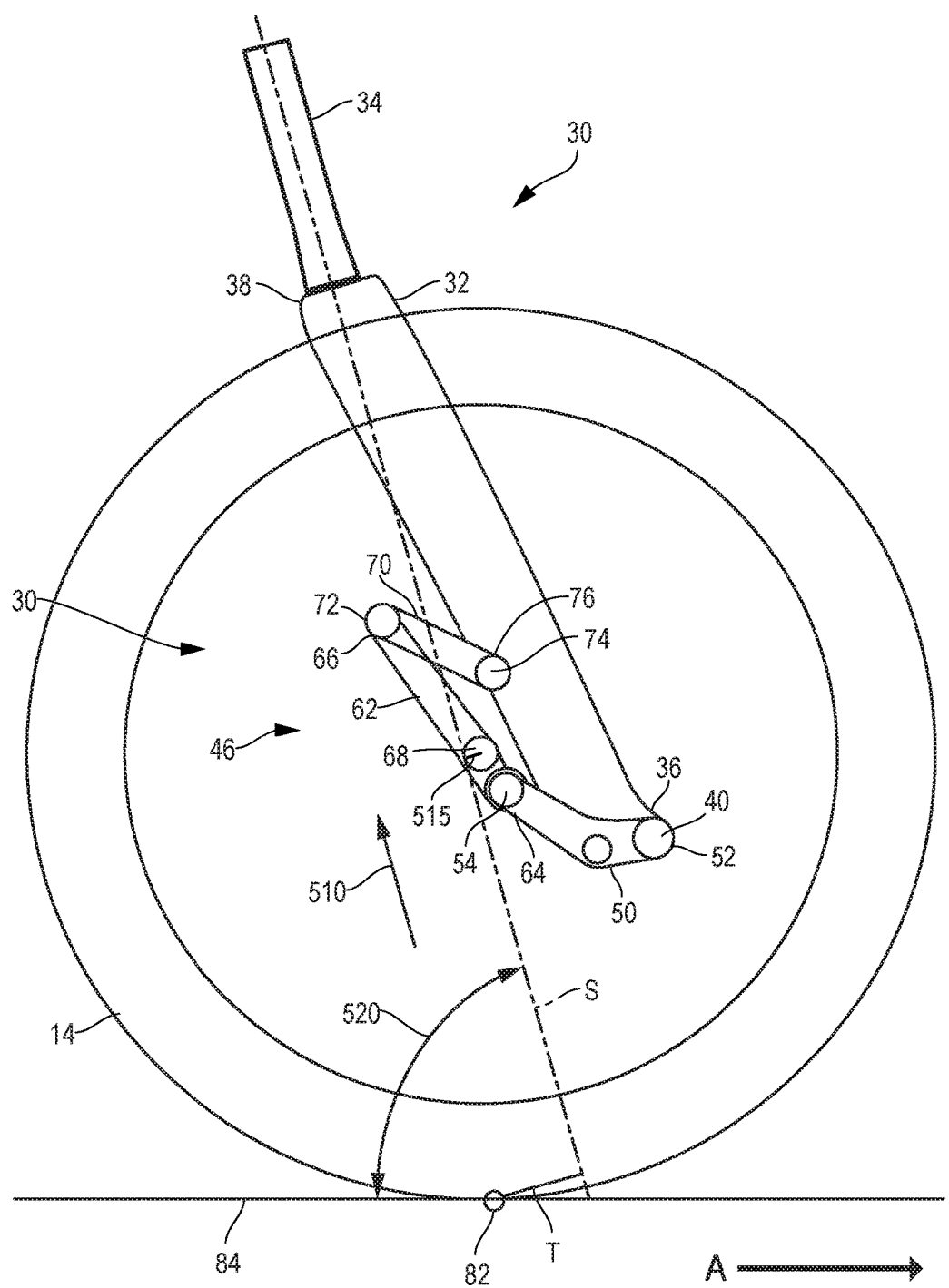
FIG. 12 is a close up side view of the first arm of the front wheel suspension assembly of FIG. 10 in a further compressed state.

In the embodiment of FIGS. 10-12, the wheel carrier 62 includes a wheel mount 68 that is located close to an axis drawn between the wheel carrier floating pivots 64, 66. This location for the wheel mount 68 results in the wheel mount 68 crossing the steering axis during compression of the suspension assembly 46.

More specifically, in the fully extended state of FIG. 10, the wheel mount 68 is located on a first side (to the front or right side in FIG. 10) of the steering axis S and the offset distance 515 is positive (to the front or right of the steering axis S). The mechanical trail distance T is correspondingly at a minimum value. As the suspension assembly 46 compresses to the partially compressed intermediate state (FIG. 11), the wheel mount 68 moves aft (left in FIG. 11) and crosses the steering axis S to a second side (to the aft or left side in FIG. 11) and the offset distance 515 is reduced to the point that it becomes negative (to the aft or left of the steering axis S). This movement results in an increase in the mechanical trail distance T to a greater value than the mechanical trail distance T of the fully extended state (FIG. 10). As the suspension assembly 46 continues to compress to the further compressed state (FIG. 12), the wheel mount 68 again moves forward and crosses the steering axis S back to the first side and becomes positive again (to the front or right of the steering axis S), which results in a decrease in mechanical trail distance T relative to the partially compressed intermediate state of FIG. 11. However, the mechanical trail distance T at the further compressed state (FIG. 12) is greater than the mechanical trail distance T in the fully extended state (FIG. 10), but less than the mechanical trail distance in the partially compressed intermediate state (FIG. 11).

Generally, as the suspension assemblies 46 described herein compress, the links in the suspension assembly 46 articulate, varying the offset distance 515, as described above. The offset distance 515 changes to counteract a concurrent steering angle 520 change such that the mechanical trail distance T is varied as described above.

Herein, particularly with regard to FIGS. 7-12, the disclosed front wheel suspension assembly is shown and described in various states of compression or displacement. It should be understood that the front wheel displacement of the suspension assemblies described herein does not include any effects of a rear wheel suspension assembly. A rear suspension assembly when present will alter the various relative changes of the offset 515, mechanical trail distance T, the steering angle 520 as shown and described during compression of the suspension assembly. Thus, the displacement of the suspension assemblies is shown and described herein as excluding any effects of a rear wheel suspension assembly. For example, where a rear wheel suspension assembly is included on a cycle in combination with a suspension assembly as disclosed herein, the cycle can be described as being capable of front wheel suspension assembly displacement as described herein and/or as demonstrating the front wheel suspension assembly compression characteristics described herein when the rear suspension assembly characteristics and effects are subtracted from the overall performance of the cycle.

The disclosed wheel suspension assemblies can be designed to be lighter in weight, lower in friction, more compliant, safer, and perform better than traditional wheel suspension assemblies.

The disclosed wheel assemblies also reduce stiction and increase stability during braking, cornering, and shock absorption, when compared to traditional wheel suspension assemblies.

The disclosed wheel suspension assemblies are particularly well suited to E-bikes. E-bikes are heavier and faster than typical mountain bikes. They are usually piloted by less skilled and less fit riders, and require a stronger front suspension to handle normal riding conditions. E-bikes are difficult to build, requiring the challenging integration of motors and batteries into frame designs. In many cases, the electric parts are large and unsightly.

E-bikes are typically cost prohibitive to build as well, requiring special fittings to adapt motors and batteries. To integrate one center-drive motor, the additional cost to the manufacturer is about double the price of a common bicycle frame. That cost is multiplied and passed onto the consumer.

The beneficial caster effect described above with respect to the disclosed wheel suspension assemblies is an important improvement over traditional wheel suspension assemblies and reduces some of the drawbacks of E-bikes.

Additionally, because the disclosed wheel suspension assemblies are not constrained by round stantions, the oval fork legs balance fore-aft and side to side compliance for ultimate traction. Combining superior chassis stiffness while eliminating stiction gives the disclosed wheel suspension assemblies a performance advantage over traditional wheel suspension assemblies.

While a two-wheeled bicycle is disclosed, the disclosed wheel assemblies are equally applicable to any cycle, such as motorcycle, unicycle, or tricycle vehicles.

Furthermore, the disclosed wheel suspension assemblies are easily retrofittable to traditional cycles.

What is claimed:

1. A suspension assembly for a cycle, the suspension assembly comprising:

a steering fork having a steering axis and a first arm, the first arm having a first end and a second end, the first arm including a first arm fixed pivot, a first arm shock pivot and a first arm control pivot;

a shock link, the shock link having a shock link fixed pivot and a shock link floating pivot spaced apart from one another, the shock link being pivotably connected to the first arm fixed pivot at the shock link fixed pivot such that the shock link is rotatable about the shock link fixed pivot and the shock link fixed pivot remains in a fixed location relative to the first arm while the shock link floating pivot is movable relative to the first arm;

a shock absorber having a first shock mount and a second shock mount, the first shock mount being connected to the first arm shock pivot, the second shock mount being pivotably connected to a shock connection pivot located between the shock link fixed pivot and the shock link floating pivot along a length of the shock link;

a wheel carrier, the wheel carrier having a wheel carrier first pivot and a wheel carrier second pivot spaced apart from one another along a length of the wheel carrier, and a wheel mount that is adapted to be connected to a wheel, the wheel carrier first pivot being pivotably connected to the shock link floating pivot so that the wheel carrier second pivot is rotatable about the wheel carrier first pivot relative to the shock link floating pivot; and a control link, the control link including a control link floating pivot and a control link fixed pivot, the control link floating pivot being pivotably connected to the wheel carrier second pivot, and the control link fixed pivot being pivotably connected to the first arm control pivot such that the control link floating pivot is rotatable about the control link fixed pivot, which remains in a fixed location relative to the first arm control pivot, wherein the fixed pivots and the floating pivots are arranged in a trailing configuration where each of the fixed pivots is forward of the corresponding floating pivot in the forward direction of travel, and wherein, a mechanical trail distance, which is a distance between a ground contact point of a wheel connected to the wheel mount and the steering axis, increases as the suspension assembly compresses relative to a fully extended state.

2. The suspension assembly of claim 1, wherein the shock connection pivot is closer to the shock link fixed pivot than to the shock link floating pivot, and a perpendicular distance between a central axis of an inshaft of the shock absorber and the shock link fixed pivot varies as the shock absorber is compressed and extended.

3. The suspension assembly of claim 2, wherein the shock absorber and the shock link generate a greater than 1:1 overall leverage ratio.

4. The suspension assembly of claim 3, wherein the instantaneous leverage ratio varies non-linearly as the shock absorber is compressed and extended.

5. The suspension assembly of claim 1, wherein the a central axis of the inshaft of the shock absorber is arranged to form an angle of between 0° and 20° relative to a central axis of the first arm, the central axis of the first arm being defined by a line between the first arm shock pivot and the first arm fixed pivot.

6. The suspension assembly of claim 5, wherein the central axis of the inshaft of the shock absorber forms an angle with the central axis of the first arm of between 0° and 15°.

7. The suspension assembly of claim 1, wherein the shock absorber is located at least partially within a hollow portion of the first arm.

8. The suspension assembly of claim 1, wherein the shock link fixed pivot is offset forward of a central axis of an inshaft of the shock absorber, the central axis of the inshaft of the shock absorber being positioned between the shock link fixed pivot and the shock link floating pivot in a plane defined by the central axis of the inshaft, the shock link fixed pivot and the shock link floating pivot.

9. The suspension assembly of claim 1, wherein a line between the wheel carrier first pivot and the wheel carrier second pivot defines a wheel carrier axis, and the wheel mount is offset from the wheel carrier axis in a plane defined by the wheel carrier axis and the wheel mount.

10. The suspension assembly of claim 9, wherein the wheel mount is offset from the wheel carrier axis towards the first arm.

11. The suspension assembly of claim 9, wherein the wheel mount is offset from the wheel carrier axis away from the first arm.

12. The suspension assembly of claim 9, wherein the wheel mount is located aft of the shock link fixed pivot, such that a central axis of the inshaft of the shock absorber is located between the wheel mount and the shock link fixed pivot in a plane defined by the inshaft of the shock absorber, the wheel mount and the shock link fixed pivot.

13. The suspension assembly of claim 1, wherein the shock absorber includes a shock body.

14. The suspension assembly of claim 13, wherein the shock absorber further includes an inshaft that extends from the shock body, the second shock mount being formed at one end of the inshaft, and the inshaft is pivotably connected to the shock connection pivot by the second shock mount such that the inshaft is compressible and extendable relative to the shock body as the shock link pivots about the fixed pivot.

15. The suspension assembly of claim 14, wherein the control link is pivotably mounted to the first arm at a second arm pivot that is located between the first arm fixed pivot and the first arm shock pivot.

16. A multi-link suspension assembly for a cycle, the multi-link suspension assembly comprising:

a steering fork having a steering axis and a first arm; and a plurality of interconnected links connected to the first arm, the plurality of interconnected links including a plurality of fixed pivots and a plurality of floating pivots, the plurality of fixed pivots and the plurality of floating pivots being arranged in a trailing configuration where each of the fixed pivots is forward of the corresponding floating pivot in the forward direction of travel;

wherein, a mechanical trail distance, which is a distance between a ground contact point of a wheel connected to the multi-link suspension assembly and the steering axis, increases as the multi-link suspension assembly compresses relative to a fully extended state.

17. The multi-link suspension assembly of claim 16, wherein the multi-link suspension assembly has the fully extended state, a partially compressed intermediate state, and a further compressed state.

18. The multi-link suspension assembly of claim 17, wherein the mechanical trail distance increases from the fully extended state to the further compressed state.

19. A multi-link suspension assembly of claim 18, for a cycle, the multi-link suspension assembly comprising:

a steering fork having a steering axis and a first arm; and a plurality of interconnected links connected to the first arm;

wherein a mechanical trail distance, which is a distance between a ground contact point of a wheel connected to the multi-link suspension assembly and the steering axis, increases as the multi-link suspension assembly compresses relative to a fully extended state, wherein the multi-link suspension assembly has the fully extended state, a partially compressed intermediate state, and a further compressed state, the mechanical trail distance increases from the fully extended state to the further compressed state, and wherein the mechanical trail distance increases at a non-constant rate.

* * * * *